US008521586B2

(12) United States Patent
Angles et al.

(10) Patent No.: US 8,521,586 B2
(45) Date of Patent: *Aug. 27, 2013

(54) SYSTEM AND METHOD FOR DELIVERING CUSTOMIZED ADVERTISEMENTS WITHIN INTERACTIVE COMMUNICATION SYSTEMS

(75) Inventors: Paul D. Angles, Los Angeles, CA (US); Douglas O. Blattner, Redondo Beach, CA (US)

(73) Assignee: Hemisphere Solutions N.A., L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/208,646

(22) Filed: Aug. 12, 2011

(65) Prior Publication Data

US 2011/0302038 A1 Dec. 8, 2011

Related U.S. Application Data

(63) Continuation of application No. 12/612,604, filed on Nov. 4, 2009, now Pat. No. 8,027,874, which is a continuation of application No. 10/107,523, filed on Mar. 26, 2002, now Pat. No. 7,636,672, which is a continuation of application No. 09/345,822, filed on Jun. 30, 1999, now Pat. No. 6,385,592, which is a continuation of application No. 08/700,032, filed on Aug. 20, 1996, now Pat. No. 5,933,811.

(51) Int. Cl.
*G06F 17/30* (2006.01)
*G06Q 30/00* (2012.01)

(52) U.S. Cl.
USPC ............... 705/14.4; 705/14.49; 705/14.66; 705/14.67; 705/14.69; 705/14.72

(58) Field of Classification Search
USPC .................................................. 705/14.1–73
See application file for complete search history.

(56) References Cited

U.S. PATENT DOCUMENTS 4,916,731 A * 4/1990 Brisson ...................... 379/93.22
5,053,955 A 10/1991 Peach et al.
(Continued)

FOREIGN PATENT DOCUMENTS

EP 0 811 942 12/1997
EP 0 822 535 2/1998
(Continued)

OTHER PUBLICATIONS

"Alpha Based Interactive Provides Hyper-Targeted Marketing Service," *PR Newswire*, Dec. 4, 1996.

(Continued)

*Primary Examiner* — Tri V Nguyen
(74) *Attorney, Agent, or Firm* — Woodcock Washburn, LLC

(57) ABSTRACT

Customized electronic advertisements are delivered in an interactive communication system. The advertisements are selected based on consumer profiles and are then integrated with content. The communication system may interconnect multiple consumer computers, multiple content provider computers and an advertisement provider computer. Whenever a consumer directs one of the consumer computers to access content on one of the content provider computers, an advertising request is sent to the advertisement provider computer. Upon receiving the advertising request, the advertising provider computer selects an advertisement based on the consumer's profile. The advertisement is then combined with the content from the content provider computer for display by the consumer. A credit is requested from the advertisement provider computer.

20 Claims, 11 Drawing Sheets

(56) References Cited

U.S. PATENT DOCUMENTS

| | | |
|---|---|---|
| 5,283,731 A | 2/1994 | Lalonde et al. |
| 5,319,455 A | 6/1994 | Hoarty et al. |
| 5,321,604 A | 6/1994 | Peach et al. |
| 5,347,632 A | 9/1994 | Filepp et al. |
| 5,392,066 A | 2/1995 | Fisher et al. |
| 5,404,505 A | 4/1995 | Levinson |
| 5,412,416 A | 5/1995 | Nemirofsky |
| 5,446,919 A | 8/1995 | Wilkins |
| 5,515,098 A | 5/1996 | Carles |
| 5,572,643 A | 11/1996 | Judson |
| 5,717,923 A | 2/1998 | Dedrick |
| 5,740,549 A | 4/1998 | Reilly et al. |
| 5,754,939 A | 5/1998 | Herz et al. |
| 5,794,210 A | 8/1998 | Goldhaber et al. |
| 5,819,092 A | 10/1998 | Ferguson et al. |
| 5,848,396 A * | 12/1998 | Gerace ............... 705/7.33 |
| 5,848,397 A | 12/1998 | Marsh et al. |
| 5,870,030 A | 2/1999 | DeLuca et al. |
| 5,901,287 A | 5/1999 | Bull et al. |
| 5,913,040 A | 6/1999 | Rakavy et al. |
| 5,933,811 A | 8/1999 | Angles et al. |
| 5,974,396 A * | 10/1999 | Anderson et al. ........... 705/7.33 |
| 6,026,368 A | 2/2000 | Brown et al. |
| 6,044,205 A | 3/2000 | Reed et al. |
| 6,047,327 A | 4/2000 | Tso et al. |
| 6,385,592 B1 | 5/2002 | Angles et al. |
| 7,146,327 B1 | 12/2006 | Howard et al. |
| 7,225,142 B1 | 5/2007 | Apte et al. |
| 7,636,672 B2 | 12/2009 | Angles et al. |
| 8,027,874 B2 | 9/2011 | Angles et al. |
| 2004/0177002 A1* | 9/2004 | Abelow ............... 705/14 |
| 2006/0116924 A1 | 6/2006 | Angles et al. |
| 2010/0049613 A1 | 2/2010 | Angles et al. |

FOREIGN PATENT DOCUMENTS

| | | |
|---|---|---|
| WO | WO 96/15505 | 5/1996 |
| WO | WO 97/41673 | 11/1997 |

OTHER PUBLICATIONS

"Bellcore Deploys Adaptive Web Software," Telecommunications Alert, United Communications Group, Jul. 1, 1996, 13(127).
Blankenhorn, D., "I/PRO Set to Track Web," I/PRO Website, downloaded May 8, 1996.
"Broadvision Uses Its On-Line Marketing Database to Deliver Personalized World Wide Web Sites," Apt Data Services, Mar. 21, 1996.
"Broadvision: Broadvision Developing First Innovative Commerce Management System to Support Online Sales & Marketing Process....," Business Wire, Business Editors and Computer Writers, May 15, 1995.
"Broadvision: Personalized Marketing and Selling on the Internet Unleashed by Broadvision....," Business Wire, Business Editors and Computer Writers, Jan. 22, 1996.
Broadvision Uses It's On-Line Marketing Database to Deliver Personalized World Wide Web Sites,Computergram International, Mar. 31, 1996, 878.
BRP Publications, "Interactive Advertising Report on Electronic Commerce," BRP Publications, Jun. 25, 1996, 3(13), 1 page.
BRP Publications, "Prodigy Launches Shopping Mall," Multimedia Daily, Oct. 29, 1996, 3(208), 1 page.
"Bellcore Adapt X Advertiser: New Software Solution for the Web Delivers Profitable, Measureable, Truly Interactive Advertising," Business Wire, Business Editors and Computer Writers, Jun. 11, 1996.
Clark, T., "It May Pay to Look at Net Ads," Interactive Week, Jun. 4, 1996.
Cleugh, M., "The Future of Financial Services on the Internet," Internet for Business, Nov. 1996, 4(8), 4 pages.
Communications Industry Researchers, Inc., "Search Engines, Knowbots and Agents: Freeloader Launches Agenting Technology Internet Content Report," IAC Newsletter, Nov. 1, 1996, 1(16), 1 page.
"The CyberGold Service," Cybergold Website, Jun. 25, 1996.
Danish, S., "PC World: PC World Online Revamps It's Presence on the Web," Business Editors and Computer Writers, Jan. 1998, 2 pages.
"Doubleclick Network Officially Exceeds 10 Million Users; Clocks One of the Fastest Growth Rates in History of Measured Media," PR Newswire, Aug. 1, 1996.
Filippi, D., "Doubleclick Debuts New Tool for Testing Creative on the Web," PR Newswire, May 20, 1996, 2 pages.
"Freeloader Releases Version 2.0; High-Bandwidth, Personalized Web Content Delivered Offline to PCT Desktops with Redesigned Interface and Screen Saver," Business Wire, Business Editors and Computer Writers, Sep. 30, 1996.
Hoffman et al., "Commercial Scenarios for the Web: Opportunities and Challenges," www.ascusc.org/jcmc, Mar. 1998, 1(3), pp. 1-21.
"What is Hyper System?" Hyper System Website, downloaded Jun. 4, 1996.
About I/Pro, I/Pro Website, Downloaded May 8, 1996.
"I PRO and Doubleclick Partner to Deliver Next Generation in Ad Targeting and Accountability," PR Newswire, Jun. 20, 1996.
IInfoworld, "Pipeline," Infoworld, Jul. 1996, 18(28), 2 pages.
Interactive, "Online Companies to Unveil New Technology," UMI Infostore, Mar. 27, 1998, p. 46.
"InterCard Proposal," Intercard Promotional Materials, Dec. 22, 1995.
"Internet Access: Internet Marketing Revolution Begins in the U.S. this September: Hyper System Promises New Cash Flow for providers, Free Access for Users * A new Marketing Opportunity for Business," Work-Group Report, Jun. 3, 1996.
McElvogue, L. "Web User Develops Program to Delete Unwanted Commercials," Los Angeles Times, Jun. 10, 1996, p. 2 pt. D, 2 pages.
Munro, R., "Argus Technologies Announces MapGuide," Business Wire, Jul. 1996, 2 pages.
Newsbytes News Network, "Infoseek Unveils User Profile Technology," Newsbytes News Network, Dec. 5, 1996, 1 page.
"Online Marketing: C/Net Introduces Customized Web Advertising: Display Banners Tailored to User Demographics," Internet Week, Dec. 18, 1995, 1(36).
"People Tyson Partners with Atlanta Software Leader to Form Doubleclick—The First Advertising Network for the Internet," PR Newswire, Feb. 5, 1996.
Runge, B., "Broadvision 2: The Angle. The First Site with a Brain. Yours. The Angle is helping people make sense of the web—faster, easier and smarter than ever before," Business Wire, Sep. 3, 1996, 3 pages.
Simba Information, Inc., "Overset: Bytes and Pieces," Media Daily, Jun. 20, 1996, 4(5), 2 pages.
Toland, P., "C/Net: The Computer Network Unveils Revolutionary Internet Advertising Tools That Allow Custom Banner Ad Delivery Based on Demographic Information," PR Newswire, Dec. 6, 1995, 2 pages.
Von der Haar, S., "Hot Café Opens Ad Dorrs," Interactive Week, May 28, 1996.

* cited by examiner

SYSTEM AND METHOD FOR DELIVERING CUSTOMIZED ADVERTISEMENTS WITHIN INTERACTIVE COMMUNICATION SYSTEMS

CROSS-REFERENCE TO RELATED APPLICATIONS

This application is a continuation of U.S. patent application Ser. No. 12/612,604, filed Nov. 4, 2009, now U.S. Pat. No. 8,027,874, which is a continuation of U.S. patent application Ser. No. 10/107,523, filed Mar. 26, 2002, now U.S. Pat. No. 7,636,672, which is a continuation of U.S. application Ser. No. 09/345,822, filed Jun. 30, 1999, now U.S. Pat. No. 6,385,592, which is a continuation of U.S. application Ser. No. 08/700,032, filed Aug. 20, 1996, now U.S. Pat. No. 5,933,811, the contents of which are incorporated by reference herein in their entirety.

TECHNICAL FIELD

The present invention relates to communication systems and, in particular, to an apparatus and method for delivering customized advertisements within interactive communications systems.

BACKGROUND

Recently, a wide range of interactive devices have been developed to provide information to consumers. These interactive devices include, for example, computers connected to various computer on-line services, interactive kiosks, interactive television systems and the like. In particular, the popularity of computer on-line services has grown immensely in popularity over the last decade.

Computer on-line services are provided by a wide variety of different companies. In general, most computer on-line services are accessed via the Internet. The Internet is a global network of computers. The structure of the Internet is a network backbone with networks branching from the backbone. These branches, in turn, have networks branching from them, and so on. Routers move information packets from network to network, until the information packets reach their destination. For a more detailed description of the structure and operation of the Internet, please refer to "The Internet Complete Reference," by Harley Hahn and Rick Stout, published by McGraw-Hill, 1994.

One popular part of the Internet is the World Wide Web. The World Wide Web contains computers which display graphical- and textual information. Computers which provide information on the World Wide Web are typically called "websites." A website is defined by an Internet address which has an associated electronic page, often called a "home page." Generally, a home page is an electronic document which organizes the presentation of text, graphical images, audio and video into a desired display. These websites are operated by a wide variety of entities which are typically called "content providers."

A user may access the Internet using a home personal computer (PC) equipped with a conventional modem. Special interface software is installed within the PC so that when the user wishes to access the Internet, an attached modem is automatically instructed to dial the telephone number associated with the local Internet host server. The user can then access information at any address accessible over the Internet. Two well-known software interfaces, for example, are the Netscape Navigator developed by Netscape, Inc. and the Microsoft Internet Explorer developed by Microsoft Corporation.

Information exchanged over the Internet is typically encoded in HyperText Mark-up Language (HTML) format. The HTML format is a scripting language which is used to generate the home pages for different content providers. In this setting, a content provider is an individual or company that places information (content) on the Internet so that it can be accessed by others. As is well known in the art, the HTML format is a set. of conventions for marking different portions of a document so that each portion appears in a distinctive format. For example, the HTML format identifies or "tags" portions of a document to identify different categories of text (e.g., the title, header, body text, etc.). When a web browser accesses a HTML document, the web browser reads the embedded tags in the document so it appears formatted in the specified manner.

A HTML document can also include hyper-links which allow a user to move from one document to another document on the Internet. A hyper-link is an underlined or otherwise emphasized portion of text which, when selected using an input device such as a mouse, activates a software connection module which allows the user to jump between documents (i.e., within the same website or to other websites). Hyper-links are well known in the art, and are sometimes referred to as anchors.

Although the Internet and the World Wide Web, together with other interactive devices, are used widely to share information among different users, the full range of possibilities for use of these interactive computer services have not yet been fully developed.

As the popularity of the Internet and the World Wide Web has increased over the years, more companies are trying to find ways of promoting their product in a cost-effective manner. Thus, there has been a tremendous proliferation of corporate advertising across the Internet. For example, some companies such as Yahoo Corporation offer free services, such as the ability to search for particular sites on the Internet, but post advertising messages to consumers to help offset the cost of their service. Unfortunately, there is so far no effective way of targeting particular advertisements to those consumers most likely to use the product or service being offered. Therefore, a tremendous amount of advertising is wasted on promoting goods or services to an improper audience. As the number of people accessing the Internet increases, it will become more important to specifically target advertising to those individuals most likely to purchase the goods or services being offered. It will also be important for advertisers to know how effective a particular ad has become by tracking the responses of individual consumers. Unfortunately, there is currently no convenient mechanism for predetermining which users might be interested in a particular category of advertised goods or services. There is also no current method for tracking consumer responses to particular advertisements.

SUMMARY

The system of the present invention overcomes the difficulties discussed above by providing an on-line advertising service which can custom tailor specific advertisements to particular consumers and track consumer responses to the advertisements. In particular, the present invention is a system and method for delivering customized advertisements to users of interactive devices. The interactive devices of the present invention can include computers connected to on-line services, interactive kiosks, interactive television systems and the like. In broad terms, the present invention includes a communications system having at least three different entities which communicate with each other. The entities include: a content provider, an advertisement provider and a consumer.

In the preferred embodiment, the invention is directed to delivering custom advertisements to consumers who use their computers to view information offered by different content providers existing on the Internet. Preferably, when a consumer accesses a content provider, the content provider transmits an electronic document to the consumer. Embedded within the electronic document is a advertisement request. When the consumer's computer displays the electronic document, the embedded advertisement request directs the consumer computer to communicate with an advertisement provider. In response, the advertisement provider provides a customized advertisement. The advertisement provider then tracks the consumer's response to the customized advertisement.

The advertisement provider operates a computer which is also connected to the Internet. The advertisement provider's computer stores demographic information about consumers, and sends customized advertisements to the consumers based on the consumers demographic profile and tracks consumer responses to the customized advertisements. For example, when accessing a content provider's website, a consumer with a demographic profile indicating an interest in farming would be sent customized advertisements for farm products by the advertisement provider. Customer requests from more information about the advertised farm products are also monitored.

A consumer who wishes to receive customized advertisements first registers with the advertisement provider by entering pertinent demographic information into the advertisement provider's demographic database. The advertisement provider then retains a demographic profile of the consumer. In return, the advertisement provider assigns the consumer a unique member code. In an alternate embodiment, the consumer is sent unique software which enhances the consumer's Internet browser so that custom advertisements can be merged with electronic documents obtained from the content provider.

The content provider websites also register with the advertisement provider before they can receive the customized advertisement services. During registration, the advertisement provider assigns a custom member code to the content provider, creates a program called a "content provider script" for each content provider, and transfers an "advertisement request" to the content provider which identifies the content provider script. Preferably, the content provider script contains the content provider's member code. The advertisement request, on the other hand, contains commands which invoke the content provider script.

After obtaining the advertisement request, the content provider embeds the advertisement request into its electronic documents. When a registered consumer accesses a content provider's website, the content provider website transfers the electronic document and the embedded advertisement request to the consumer's computer. The embedded advertisement request directs the consumer computer to invoke the referenced content provider script in the advertisement provider computer. The advertisement provider executes the content provider script and obtains the content provider member code. The advertisement provider uses the content provider member code to track the number of advertisements displayed by a particular content provider.

In addition, to executing the content provider script, the advertisement provider also obtains the consumer's member code from the consumer computer. The advertisement provider uses the consumer member code to identify the consumer's demographic profile and preferences. The advertisement provider then selects an appropriate advertisement based on the consumer's profile and sends the customized advertisement to the consumer computer. The consumer computer then merges the content provider's electronic document with the advertisement provided by the advertisement provider to create a single displayed document to the consumer.

Another feature of the invention is directed to monitoring the particular advertisements which are viewed by particular consumers. With this information, advertisers can pay for advertising directed at specific demographic target groups. Additionally, advertisers may be billed by the advertisement provider based on actual delivery of the advertisements to pertinent consumers.

The invention also supports custom advertisements which can contain hyper-links to other information. The hyper-links typically direct the users Internet browser to access different websites on the Internet. For example, if a consumer wishes to obtain additional information about an advertised product or service, the consumer may simply use a mouse to select an embedded hyper-link in the custom advertisement and be immediately transported to an advertiser's website. At the advertiser's website, the user may receive a directed sales pitch, more information or a purchase order request form.

An additional feature of the invention allows the advertisement provider to monitor the number of advertisements viewed by consumers associated with a particular content provider. With this information, the content providers can receive advertising revenue based on the number of consumers who access their websites. This frees the content providers from having to generate advertising data, from having to individually contact advertisers, from having to negotiate advertising payment fees, and from having to maintain an advertising administrative staff.

Another aspect of the invention relates to the addition of a fourth category of entities C the Internet providers. An Internet provider is a service which provides Internet access to consumers. Examples of Internet providers include American On-line, the Microsoft Network, Prodigy, Compuserve, and Network Intensive. Many users pay monthly access fees to the Internet providers to obtain local telephone connections, a variety of help services and an organized format for accessing the Internet.

When a consumer registers with the advertisement provider, this aspect of the present invention obtains information about the consumers Internet provider and stores this information in the demographic profile. The system of the present invention can then monitor the number of advertisements viewed by consumers associated with a particular Internet provider. Accordingly, the system of the present invention can pay an Internet provider based on the number of advertisements viewed by its consumers. The Internet providers can then use this advertising revenue to reduce consumer access fees.

DETAILED DESCRIPTION OF ILLUSTRATIVE EMBODIMENTS

Figure 1:
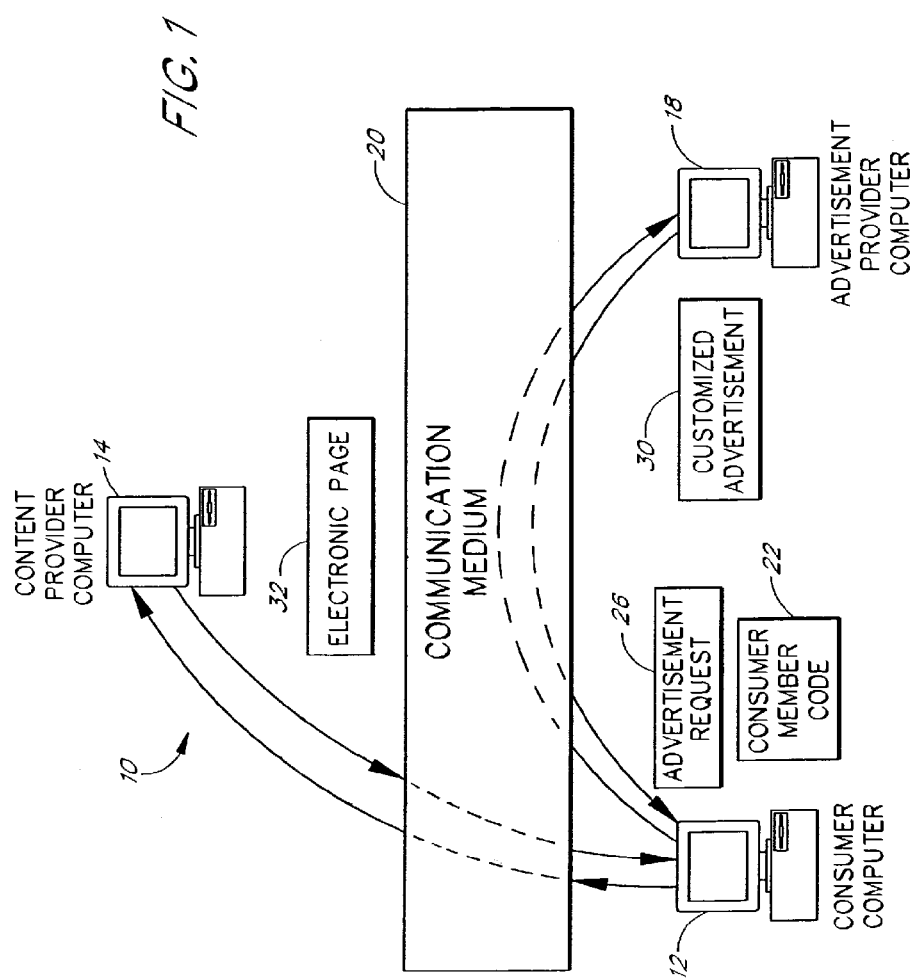
FIG. 1 is a high level block diagram of the preferred system of the present invention and illustrates the interaction between the consumer computer, content provider computer, and advertisement provider computer.

The present invention is an apparatus and method for providing customized advertisements to consumers. In a preferred embodiment, the customized advertisements are generated by an advertisement provider computer whenever a consumer accesses a content provider website. Although the present invention is described herein with reference to a preferred interactive communications system, the invention is not so limited, and can be used in a variety of other contexts in which it is desirable to provide customized advertisements to consumers.

To facilitate a complete understanding of the invention, the remainder of the detailed description is arranged within the following sections and subsections:

I. Glossary of Terms and Acronyms
II. Overview of the Preferred Interactive Communication System
III. Implementation of the Preferred Interactive Communication System [0041]
   A. The Communication Medium
   B. The Consumer Computers
   C. The Content Provider Computers
   D. The Advertisement Provider Computer
IV. Registration and Customized Advertisement Processing
   A. Consumer Registration
   B. Content Provider Registration
   C. Customized Advertisement Processing
V. Other Embodiments
VI. Conclusion

I. GLOSSARY OF TERMS AND ACRONYMS

The following terms and acronyms are used throughout the detailed description:

Client-Server. A model of interaction in a distributed system in which a program at one site sends a request to a program at another site and waits for a response. The requesting program is called the "client," and the program which responds the request is called the "server." In the context of the World Wide Web, the client is typically a "Web browser" which runs on a user's computer; the program which responds to Web browser requests at a website is commonly referred to as a "Web server."

Common Gateway Interface (CGI). A standard interface which specifies how a Web server (or possibly another information server) launches and interacts with external programs (such as a database search engine) in response to requests from clients. For example, when a consumer Web user fills out an on-screen form which is linked to a database query, the on-screen form will invoke a common gateway interface program (called a CGI "script") which processes the desired database query. For more information on the common gateway interface, see Ian S. Graham, *The HTML Source Book*, John Wiley and Sons, Inc., 1995 (ISBN 0471-11894-4), pp. 231-278.

Digital Cash. In digital cash commerce, a consumer who maintains an electronic bank account and a payee who maintains an electronic bank account can engage in on-line transactions. When the consumer purchases a good or service with digital cash, the consumer's bank account is automatically debited and the payee's bank account is automatically credited. Likewise, when providing a digital cash refund or transfer, the payee can debit its own bank account while crediting the consumers bank account.

Internet. A collection of interconnected (public and/or private) networks that are linked together by a set of standard protocols to form a distributed network. While this term is intended to refer to what is now commonly known as the Internet, it is also intended to encompass variations which may be made in the future, including changes and additions to existing standard protocols.

HyperText Markup Language (HTML). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyper-links"). For more information on HTML, see Ian S. Graham, *The HTML Source Book*, John Wiley and Sons, Inc., 1995 (ISBN 0471-11894-4).

Hypertext Transport Protocol (HTTP). The standard World Wide Web client-server protocol used for the exchange of information (such as HTML documents, and client requests for such documents) between a Web browser and a Web server. HTTP includes a number of different types of messages which can be sent from the client to the server to request different types of server actions. For example, a "GET" message, which has the format GET <URL>, causes the server to return the document or file located at the specified Universal Resource Locator (URL).

Persistent Client State Cookies (Cookie). A file stored on the client computer which contains information such as user names and preferences. In the preferred embodiment, the Cookie in the consumer computer stores a member code which uniquely identifies each consumer. The specification for Cookies can be found at hftp://www.netscape.com/newsref/std/cookie_spec.html.

Plug-in. A plug-in is a custom application which allows developers to customize or enhance features of Web browsers and Web servers. Thus, a plug-in works in concert with the Web browser or a Web server to provide additional features. Typically, a HTML tag exists in a HTML document which commands the Web browser or Web server to launch the plug-in. For example, a HTML tag may command a Web browser to execute a plug-in which communicates with an external database. The plug-in specification documentation can be found at http://www.netscape.com and http://www-.microsoft.com.

Transmission Control Protocol/Internet Protocol (TCP/IP). A standard Internet protocol (or set of protocols) which specifies how two computers exchange data over the Internet. TCP/IP handles issues such as packetization, packet addressing, handshaking and error correction. For more information on TCP/IP, see Volumes I, II and III of Corner and Stevens, *Internetworking with TCP/IP*, Prentice Hall, Inc., ISBNs 0-13-468505-9 (vol. I), 0-13-125527-4 (vol. II), and 0-13-474222-2 (vol. III).

Uniform Resource Locator (URL). A unique address which fully specifies the location of a file or other resource on the Internet. The general format of a URL is protocol://machine address:port/path/filename. The port specification is optional, and if none is entered by the user, the Web browser defaults to the standard port for whatever service is specified as the protocol. For example, if HTTP is specified as the protocol, the Web browser will use the HTTP default port.

World Wide Web ("Web"). Used herein to refer generally to both (1) a distributed collection of interlinked, user-viewable hypertext documents (commonly referred to as "Web documents" or "electronic pages" or "home pages") that are accessible via the Internet, and (2) the client and server software components which provide user access to such documents using standardized Internet protocols. Currently, the primary standard protocol for allowing applications to locate and acquire Web documents is the HyperText Transfer Protocol (HTTP), and the electronic pages are encoded using the HyperText Markup Language (HTML). However, the terms "Web" and "World Wide Web" are intended to encompass future markup languages and transport protocols which may be used in place of or in addition to the HyperText Markup Language and the HyperText Transfer Protocol.

II. OVERVIEW OF THE PREFERRED INTERACTIVE COMMUNICATION SYSTEM

This section provides an overview of an interactive communication system in a preferred embodiment of the present invention. A block diagram of the preferred interactive communication system is shown in FIG. 1. The interactive communication system 10 includes a consumer computer 12, a content provider computer 14 and an advertisement provider computer 18 which communicate with each other by use of a communication medium 20.

In operation, a consumer directs the consumer computer 12 to communicate with the content provider computer 14 via the communication medium 20. Once the consumer computer 12 establishes a communication link with the content provider computer 14, the content provider computer 14 transfers an electronic page 32 to the consumer computer 12. The preferred electronic page 32 contains an embedded advertisement request 26.

When the consumer computer 12 receives the electronic page 32, it executes the embedded advertisement request 26. The embedded advertisement request 26 directs the consumer computer 12 to establish a communications link with the advertisement provider computer 18. Furthermore the embedded advertisement request 26 directs the advertisement provider computer 18 to execute a content provider script (not shown). The content provider script exists on the advertisement provider computer 18 and contains a content provider member code (not shown). The advertisement provider computer 18 uses the content provider member code to track the number of advertisements viewed by the consumer computers 12 connected to a particular content provider computer 14.

In addition, the consumer computer 12 contains a consumer member code 22 which uniquely identifies the consumer. The advertisement provider computer 18 obtains the consumer member code 22 and uses the consumer's member code 22 to access the consumer's profile in a demographic database (not shown). Based on the consumer's profile, the advertisement provider computer 18 selects an appropriate customized advertisement 30. The advertisement provider computer 18 then sends the customized advertisement 30 to the consumer computer 12. As discussed in more detail below, the consumer computer 12 merges the electronic page 32 and customized advertisement 30.

Figure 2:
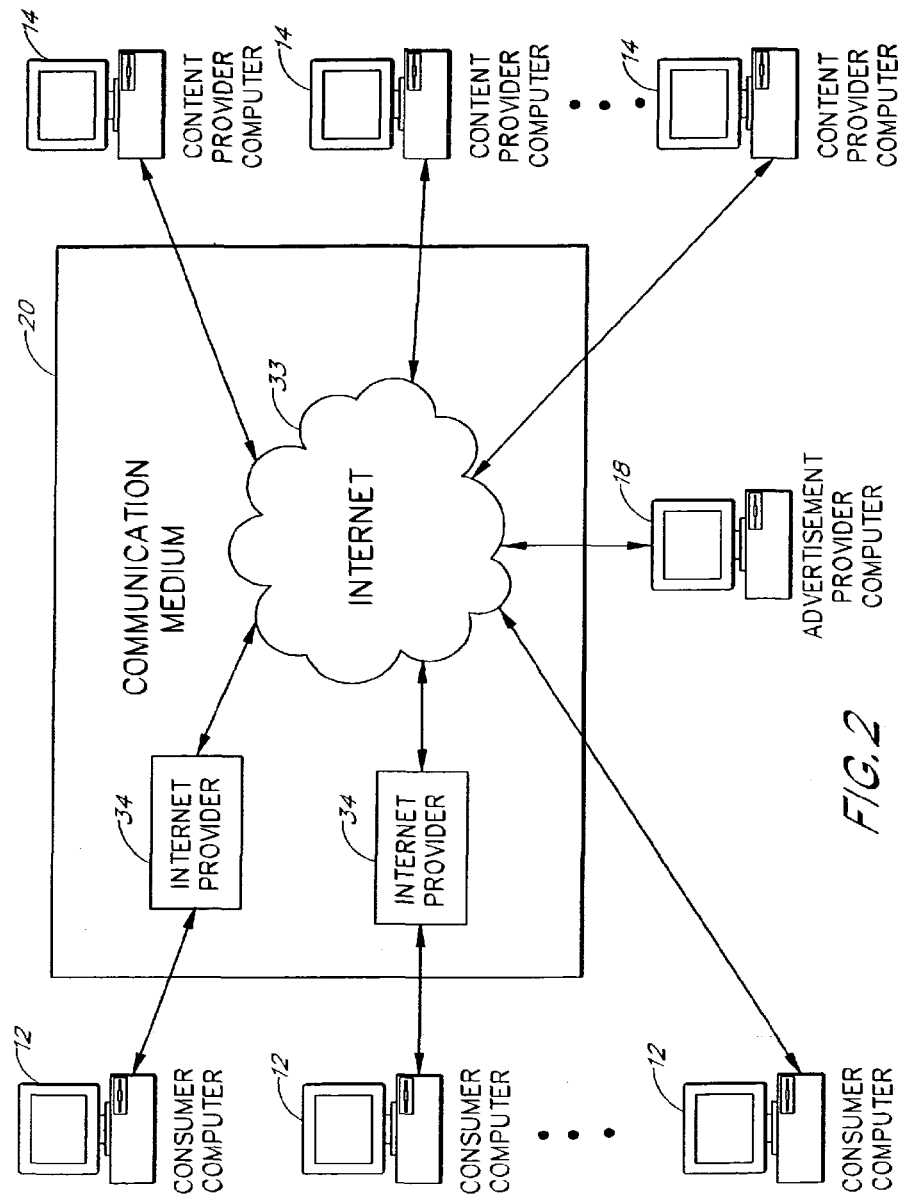
FIG. 2 is a block diagram of the preferred system of the present invention showing the interaction of many consumer computers and content provider computers with an advertisement provider computer.

As shown in FIG. 2, a single advertisement provider computer 18 also supports an interactive communication system with multiple consumer computers 12 and multiple content provider computers 14. As different consumer computers 12 access different content provider computers 14, the content provider computers 14 communicate with the advertisement provider computer 18 as discussed above. In the preferred embodiment, the advertisement provider computer 18 is configured to respond to each of the content provider 14 computers in a timely manner. It should be noted that a single advertisement provider 18 can manage requests from numerous content providers and act like a "clearing house" for advertisements.

Figure 3:
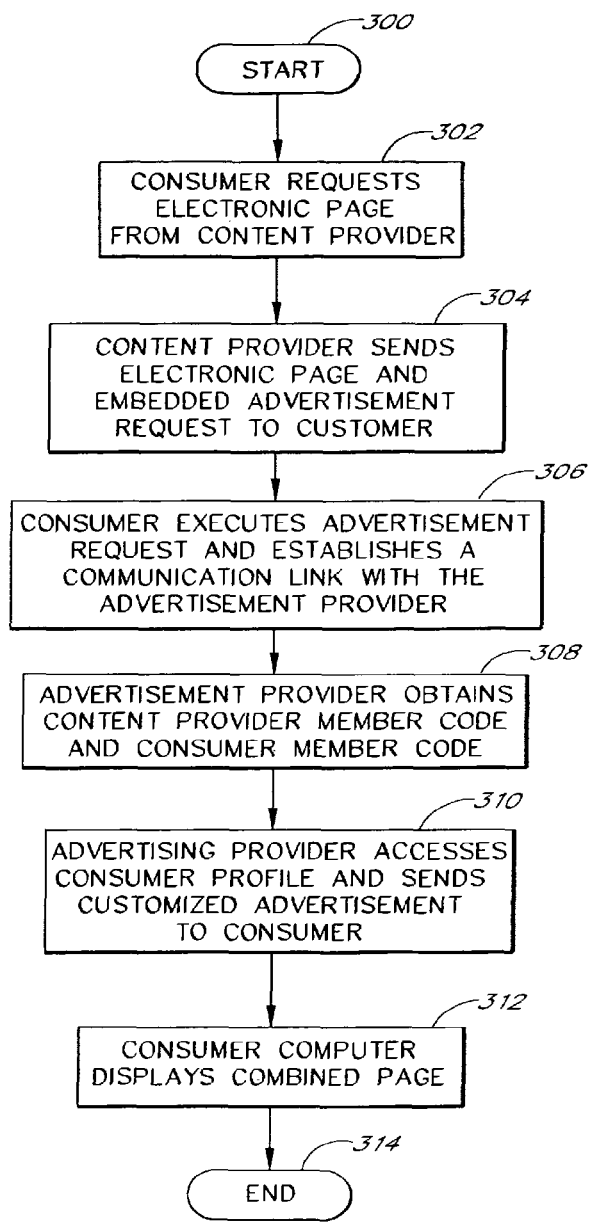
FIG. 3 is a high level flow diagram of the preferred process for sending electronic information and custom advertisements to a consumer computer.

Referring to FIG. 3, an overview of the process of a consumer requesting an electronic document is shown. At start state 300 the process initializes and moves to state 302 wherein the consumer computer 12 requests an electronic page 32 from the content provider computer 14. As discussed in more detail below, the consumer computer 12 uses internet browsing software (not shown) to access the content provider's URL address. The consumer browser software then accesses an electronic document 32 stored on the content provider computer 14.

Moving to state 304, the content provider computer 14 sends the electronic document 32 and the embedded advertisement request to the consumer computer 12. Proceeding to state 306, the consumer computer executes the advertisement request 26 and establishes a communications link with the advertisement provider computer 18. Proceeding to state 308, the advertisement request 26 directs the advertisement provider computer 18 to execute a content provider script which contains the content provider member code. In addition, during state 308, the advertisement provider computer 18 obtains the consumer member code 22 stored on the consumer computer 12.

Proceeding to state 310, the advertisement provider computer 18 uses the consumer member code 22 to access the consumer's profile. The advertisement provider computer 18 selects an appropriate advertisement based on the consumer's profile and then sends the customized advertisement 30 to the consumer computer 12.

Proceeding to state 312, the process combines the electronic page 32 from the content provider computer 14 and the customized advertisement 30 from the advertisement provider computer 18 into a displayable page. Once the combined page has been displayed to the consumer, the process ends at end state 314.

III. IMPLEMENTATION OF THE PREFERRED INTERACTIVE COMMUNICATION SYSTEM

A. The Communication Medium

Focusing now on the communication medium 20 as shown in FIG. 2, the presently preferred computer medium includes the Internet 33 which is a global network of computers. The structure of the Internet 33, which is well known to those of ordinary skill in the art, includes a network backbone with networks branching from the backbone. These branches, in turn, have networks branching from them, and so on. Routers move information packets between network levels, and then from network to network, until the packet reaches the neighborhood of its destination. From the destination, the destination network's host directs the information packet to the appropriate terminal, or node. For a more detailed description of the structure and operation of the Internet 33, please refer to "The Internet Complete Reference," by Harley Hahn and Rick Stout, published by McGraw-Hill, 1994.

In one advantageous embodiment, the Internet routing hubs comprise domain name system (DNS) servers, as is well known in the art. DNS is a Transfer Control Protocol/Internet protocol (TCP/IP) service that is called upon to translate domain names to and from Internet Protocol (IP) addresses. The routing hubs connect to one or more other routing hubs via high speed communication links.

One of ordinary skill in the art, however, will recognize that a wide range of interactive communication mediums can be employed in the present invention. For example, the communication medium 20 can include interactive television networks, telephone networks, wireless data transmission systems, two-way cable systems, customized computer networks, interactive kiosk networks, automatic teller machine networks, and the like.

In addition to the Internet 33, the communication medium 20 may also contain Internet providers 34. An Internet provider 34 is a computer system which provides Internet 33 access to the consumer computers. Examples of Internet providers 34 include American On-line, the Microsoft Network, Prodigy, Compuserve, and Network Intensive to name a few. Many users pay monthly access fees to the Internet providers 34 because the Internet providers 34 provide local telephone connections, a variety of help services and an organized format for accessing the Internet 33.

The Internet providers 34 are optional, and in some cases, the consumer computers 12 may have direct access to the Internet 33. For example, the consumer computers 12 may be connected to a local area network which in turn is directly connected to the Internet 33. It should be understood that the local area network may also connect to the Internet 33 via a conventional telephone line; however, since local area networks typically have a higher volume of data traffic, it is advantageous to include a high-speed connection to support the volume of information which the local area network will transfer to and from the Internet 33.

As further depicted in FIG. 2, an Internet provider 34 connects a consumer computer 12 to the Internet 33. Typically, the Internet provider 34 is connected to an Internet routing hub via a high speed communications link. The communication links, in turn, connect to the content provider computers. When a consumer desires to access information available on the Internet 33 via an Internet provider 34, the consumer initiates a connection with the Internet provider 34 from his or her consumer computer 12.

For example, the consumer invokes a browser which executes on the consumer computer 12. The browser, in turn, establishes a communication link directly with the Internet 33 or with the Internet provider 34 via a communications link. Once connected to the Internet provider 34, the consumer can direct the browser to access information provided by one of the content provider computers 14. The Internet provider 34 then communicates with the Internet 33 to establish a communications link between the consumer computer 12 and the desired content provider computer 14.

One popular part of the Internet 33 is the World Wide Web. The World Wide Web contains different computers which store HTML documents capable of displaying graphical and textual information. The content provider computers 14 which provide information on the World Wide Web are typically called "websites." A website is defined by an Internet address which has an associated electronic page. Generally, an electronic page is a document which organizes the presentation of text, graphical images, audio and video. As discussed above, these websites are operated by a wide variety of content provider computers 14.

B. The Consumer Computers

Figure 4:
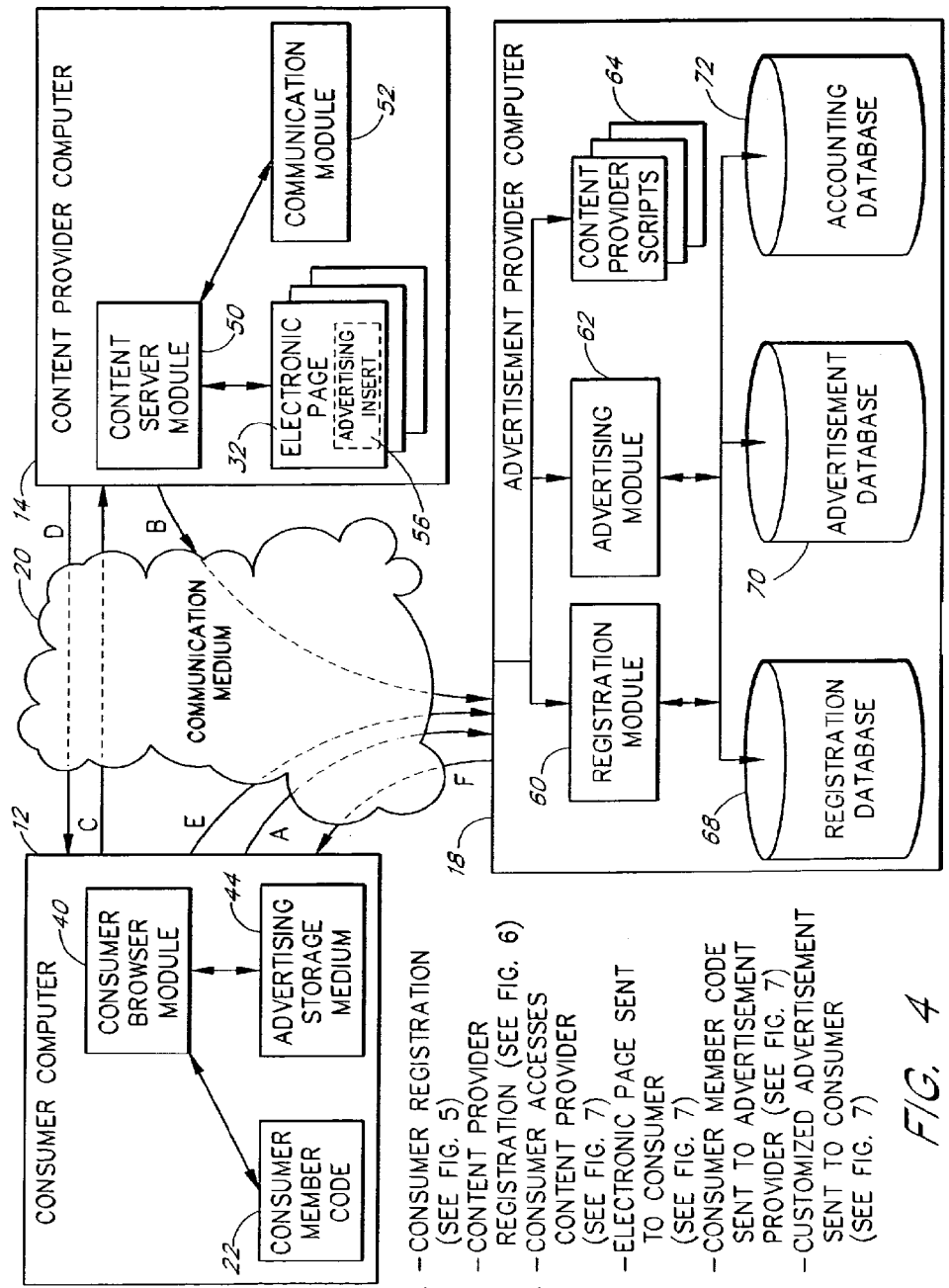
FIG. 4 is a block diagram of the preferred system of the present invention showing the flow of information among the consumer computer, content provider computer and advertisement provider computer through a communication medium.

Focusing now on the consumer computer 12 as illustrated in FIG. 4, the consumer computer 12 is a device which allows a consumer to interact with the communication medium 20. In the preferred embodiment, the consumer computer 12 is a conventional computer which is equipped with a conventional modem. Preferably, the consumer computer 12 runs an appropriate operating system such as the Microsoft7 Windows7 3.1, Microsoft7 Windows 95, Microsoft7 Windows7 NT, the Apple7 MacOS7, or IBM7 OS/27 operating systems. As is conventional, the preferred operating system includes a TCP/IP stack which handles all incoming and outgoing message traffic passed over the Internet 33.

In other embodiments, the consumer computer 12 could, for example, be a computer workstation, a local area network of individual computers, an interactive television, an interactive kiosk, a personal digital assistant, an interactive wireless communications device or the like which can interact with the communication medium 20. While in such systems, the operating systems will differ, they will continue to provide the appropriate communications protocols needed to establish communication links with the communication medium 20.

In the preferred embodiment, the consumer computer 12 utilizes several operational modules including a consumer browser module 40, a consumer member code 22 and an advertising storage medium 44. The consumer browser module 40 (hereinafter referred to as the consumer browser) is a software program which allows a consumer to access different content providers through the communication medium 20. In the preferred embodiment, the consumer browser 40 is the Netscape7 Navigator developed by Netscape, Inc. or the Microsoft7 Internet Explorer developed by Microsoft Corporation. One of ordinary skill in the art, however, will recognize that numerous other types of access software could also be used to implement the present invention. These other types of access software could, for example, be other types of Internet browsers, custom network browsers, two-way communications software, cable modem software, point-to-point software and the like.

The consumer member code module 22 stores a code which uniquely identifies each consumer. In the preferred embodiment, the consumer member code module 22, which is hereinafter referred to as the consumer member code 22, is a set of alpha-numeric characters. The consumer member code 22, as is discussed in more detail below, is assigned when the consumer registers with the advertisement provider computer 18. Thus, when a consumer registers with the advertisement provider computer 18, the consumer is assigned a unique member code. A copy of the consumer member code 22 is then stored on the consumer computer 12 in a "cookie".

A "cookie" is a small piece of information which a web server (via a CGI script) can store with a web browser and later read back from that browser. This is useful for having the browser remember some specific information across several pages; for example, when the consumer browses through a "virtual shopping mall" and add items to his "shopping cart," a list of the items he has picked up is kept in the consumer browser's cookie file so that the consumer can pay for all the items at once he has finished shopping.

To create a cookie, a web server sends a "Set-Cookie" HTTP header line in response to a URL access from a browser:

Set-Cookie: NAME=VALUE; expires=DATE; path=PATH; domain=DOMAIN_NAME; secure

NAME and VALUE are the actual information to include in the cookie. DATE is the time at which the cookie information expires and will be "forgotten" by the browser. DOMAIN is a host or domain name for which the cookie is valid. PATH specifies a subset of the URLs at that server for which the cookie is valid; If "secure" is included in the cookie, then the cookie will only be transmitted over a secure network connection. All of these fields except NAME=VALUE are optional.

Whenever the browsing software sends a HTTP request for a URL on a server for which it has stored cookies, it includes a line in the form: Cookie: NAME=VALUE; NAME=VALUE; . . . which lists all cookies that apply to that particular URL. The following is a sample CGI program (a Unix shell script) that sends a cookie to a particular URL.

```
#!/bin/sh
echo "Content-type: text/html"
echo "Set-cookie: codeno=12345A; expires=Thursday,
01-Jan-98 - 12:00:00 GMT"
echo ""
echo "<H1> Here is the member code number </H1>
"Codeno=123456"" (This is stored with the browser)
(end)
```

The following is an exemplary script which reads a cookie:

```
#! /bin/sh
echo "Content-type: text/html"
echo ""
echo "Here is the member code: <P>"
echo "$HTTP_COOKIE<P>"
(end)
```

An advertising storage medium 44 can also be included in the consumer computer 12, but is optional. In one embodiment, the advertising storage medium 44 is a compact disk drive and a compact disk. The compact disk stores a variety of advertisements which can be retrieved and displayed by the consumer computer 12. The advertising storage medium 44, however, can consist of a wide range of data storage devices including, but not limited to, digital video devices, floppy disks, hard drives, system memory, tape drives, Personal Computer Memory Card Interface Adapter cards (PCMCIA cards), and the like. As is discussed in more detail below, in one embodiment of the present invention, the consumer computer 12 receives an advertisement command which directs the consumer computer 12 to retrieve and display one of the advertisements stored on the advertising storage medium 44.

Preferably, the advertisement command identifies a particular location on the advertising storage medium 44, such as the particular track and sector where an advertisement is located. Because current communications systems transfer data at much slower rates than local storage devices, the consumer computer 12 can retrieve an advertisement from the advertising storage medium 44 much faster than obtaining the advertisement directly from the advertisement provider computer 18. Accordingly, a short advertisement command can be sent which specifically retrieves a particular advertisement from the advertising storage medium, which significantly reduces transmission times and response times across the communication medium 20.

C. The Content Provider Computers

A wide range of information and services are available to the consumers by accessing information stored on different content provider computers 14. In the preferred embodiment, the content provider computers 14 are websites on the World Wide Web. Preferably, the content provider computer 14 is a conventional computer which is equipped with a communications link to the Internet 33. Preferably, the content provider computer 14 runs an appropriate operating system such as Unix, Microsoft7 Windows7 3.1, Microsoft7 Windows 95, Microsoft7 Windows7 NT, the Apple7 MacOS7 or IBM7 OS/27 operating system. As is conventional, the preferred operating system includes a TCP/IP stack which handles all incoming and outgoing message traffic passed over the Internet 33.

The content provider computers 14 can, however, include a wide range of devices with provide information, graphics or text. These devices may contain specialized operating systems which communicate using their respective communications protocols. For example, the content provider computers 14 can include, network servers, video delivery systems, audio-visual media providers, television programming providers, telephone switching networks, wireless communication centers and the like.

As illustrated in FIG. 4, the content provider computer 14 in the preferred embodiment delivers information to the consumer computer 12 by utilizing a variety of operational modules. These modules include a content server module 50 and one or more electronic pages 32.

The preferred content server module 50, which is hereinafter referred to as the content server 50 is a standard Web server software system which serves electronic pages. The content server 50 may be, for example, Netscape's Internet Server software, Microsoft's Internet Server software or the like. Such server software is configured to process messages from the consumer computers 12 and display desired electronic pages. In particular, the server software sends copies of HTML pages to each consumer computer 12 which accesses the content provider computer 14.

The electronic page module 32 within the content provider computer 14, which is hereinafter referred to as the electronic pages 32, provides an organizational structure for presenting information to the consumer. In addition, each electronic page 32 contains an advertisement insert 56. The advertisement insert 56 is a place-holder configured to contain the customized advertisement 30 generated by the advertisement provider computer 18. In the preferred embodiment, the electronic pages 32 are HTML documents which contain HTML encoding.

HTML encoding is a script encoding language which is used to define document content information. As is well known in the art, HTML is a set of conventions for marking portions of a document so that, when accessed by a browser, each portion appears with a distinctive format. The HTML indicates, or "tags," portions of the document (e.g., the title, header, body text, etc.). In the preferred embodiment, the advertising insert 56 contains the advertisement request 26. The advertisement request 26 references a content provider CGI script 64 which exists on the advertisement provider computer 18. Preferably, the advertising request 26 is an HTML tag which identifies 1) the content provider script and 2) the content provider member code and 3) the Internet address or URL of the advertisement provider computer 18.

As discussed in more detail below, when each content provider 14 registers with the advertisement provider computer 18, the advertisement provider computer 18 creates a unique content provider member code. In addition, the advertisement provider computer 18 creates a custom content provider CGI script 64 which stores the content provider member code. This custom content provider CGI script 64 is hereinafter referred to as the content provider script 64. When the advertisement provider computer 18 executes the content provider script 64, the advertisement provider computer 18 identifies which content provider computer 14 is being accessed by a consumer computer 12.

D. The Advertisement Provider Computer

The advertisement provider computer 18 shown in FIG. 4 maintains consumer information and generates customized advertisements 30. In the preferred embodiment, the advertisement provider computer 18 is a website connected to the World Wide Web. Preferably, the advertisement provider computer 18 is a conventional computer which is equipped with a communications link to the Internet 33. Preferably, the advertisement provider computer runs an appropriate operating system such as Unix, the Microsoft7 Windows7 3.1, Microsoft7 Windows 95, Microsoft7 Windows7 NT, the Apple7 MacOS7, the IBM7 OS/27 operating systems or the like. As is conventional, the preferred operating system includes a TCP/IP stack which handles all incoming and outgoing message traffic passed over the Internet 33.

The advertisement provider computer 18 can, however, include a wide range of mechanisms for providing registration services and customized advertisement 30. These devices may contain specialized operating systems which communicate with their respective communication medium using the appropriate communications protocols. For example, the advertisement provider computers 18 can include, a server within a computer network, a provider of video delivery systems, audio-visual media server, a television programming provider, a computer connected to a telephone switching network, a computer server in a wireless communication center and the like.

The advertisement provider computer 18 utilizes a variety of modules to store customer information and to generate customized advertisements 30. The modules include a registration module 60, an advertising module 62, a registration database 68, an advertisement database 70 and an accounting database 72. The registration module 60, as is discussed in more detail below, allows customers to register with the advertisement provider computer 18.

In the preferred embodiment, the registration module 60 is an enhancement to a standard Web server. The standard Web server software may be, for example, Netscape's Internet Server software, Microsoft's Internet Server software or the like. Such server software is configured to process messages from the consumer computers 12.

In the preferred embodiment, the registration module 60 further enhances the standard server software by providing software routines which (1) assign the consumer member codes 22, (2) transfer each consumer member code 22 to the consumer computers 12, (3) assign the content provider member codes, (4) create the content provider scripts and (5) transfer the advertising request 26 to the content provider computers 14. This enhanced functionality is preferably implemented with the content provider scripts or alternatively, is integrated with the server software. For example, the enhancements can be integrated as application programming interfaces which are combined with the Netscape Server Application Programming Interface (NSAPI) or the Microsoft Internet Server Application Program Interface (ISAPI).

When a consumer computer 12 or a content provider computer 14 first accesses the advertisement provider computer 18, the registration module 60 displays registration information. In particular, the server software displays copies of HTML pages to each consumer computer 12 and content provider computer 14 which desires to register with the advertisement provider computer 18.

Thus, when a consumer registers with the advertisement provider computer 18, the registration module 60 displays a HTML document which prompts the consumer to enter demographic data. The demographic data can contain a wide variety of information, including, but not limited to, age, sex, income, career, interests, hobbies, consumer preferences, the account number of the consumer's Internet provider, other account information, etc. Once the consumer enters the demographic data, the registration module 60 stores the demographic data as a profile in the registration database 68.

The registration module 60 also, as explained in more detail below, assigns the consumer a consumer member code 22. The registration module 60 not only stores the consumer member code 22 in the registration database 68, but also sends a copy of the consumer member code 22 to be stored in a cookie on the consumer's computer 12.

When a content provider registers with the advertisement provider computer 18, the registration module 60 displays a HTML document which prompts the content provider to enter demographic data. The demographic data includes, but is not limited to, the content provider's website address, the name of the content provider, the type of products and services sold by the content provider, the size of the content provider, the content provider's account information, etc. Once the content provider enters the demographic data, the registration module 60 stores the data in the registration database 68.

The registration module 60 also assigns the content provider a content provider member code 54, stores the content provider member code 54 in the registration database 68, creates the custom content provider scripts 64, creates the advertisement request 26. The registration module 60 also is configured to send the advertisement request 26 to the content provider computer 14.

Preferably, the registration database 68 is implemented with Structured Query Language (SQL) code. The structured query language is a language standardized by the International Standards Organization (ISO) for defining, updating and querying relational databases. For example, the registration database can be implemented with any number of commercial database programs including Microsoft7 Access, Oracle's relational database products and the like.

Focusing now on the advertising module 62 illustrated in FIG. 4, the advertising module 62 processes messages from the consumer computers 12. In the preferred embodiment, the advertising module 62 is a standard Web server. The advertising module 62 may be, for example, Netscape's Internet Server software, Microsoft's Internet Server software or the like. Such server software is configured to process advertisement requests 26 from the consumer computer 12.

In the preferred embodiment, the advertisement requests 26 are embedded into the content provider's electronic documents 32. When the consumer computer 12 receives the advertisement requests 26, the consumer computer 12 executes the advertisement request 26. In the preferred embodiment, the advertisement request 26 is an HTML tag which directs the consumer computer 12 to establish a communication link with the advertisement provider computer 18. In addition, the HTML tag in the advertisement request 26 directs the advertising module 62 to execute the content provider script 64 associated with the accessed content provider 14.

The advertising module 62 executes the content provider script 64 and obtains the content provider member code. In addition, the advertising module 62 uses the content provider member code 54 to obtain information about the content provider. In addition, the advertising module 62 obtains the consumer member code 22 from the consumer computer 12.

The advertising module 62 uses the consumer member code 22 to obtain a consumer profile from the registration database 68. As discussed in more detail below, the advertising module 62 then uses the consumer profile to select an appropriate advertisement from the advertisement database 70. In another embodiment, the advertising module 62 uses both the consumer profile and the content provider information to select an appropriate advertisement from the advertisement database 70. The advertising module 62 then sends a customized advertisement 30 directly to the consumer computer 12 to be incorporated into an electronic page 32 from the content provider computer 14.

Focusing now on the advertisement database 70 illustrated in FIG. 4, the advertisement database 70 contains numerous advertisements which have been designed for different types of consumers. For example, one version of an advertisement can be directed to selling fruit juice to children. Other versions of the advertisement, can be directed to selling the same fruit juice to teenagers, adults, or different demographic groups. The different versions of the advertisements are organized in the advertisement database 70 into different demographic categories which can be defined by the advertisement provider.

In addition, in the preferred embodiment, the advertisements are HTML compatible, such that an advertisement can contain hyper-links to other information. These hyper-links can contain for example, the URL of another content provider computer 14 which contains more information about the advertised product, sales pitches, electronic catalogs, purchase order forms and the like. For example, if after viewing a customized advertisement 30, a consumer wishes to obtain additional information about an advertised product or service, the consumer can simply select the hyper-link in the custom advertisement 30 and be immediately transported to a different content provider computer 14 which contains more advertising information.

In the preferred embodiment, the advertisement database 70 is implemented with Structured Query Language (SQL) code. The structured query language is a language standardized by the International Standards Organization (ISO) for defining, updating and querying relational databases. For example, the advertisements can be organized and stored in the advertisement database 70 with any number of commercial database programs including Microsoft7 Access, Oracle's relational database products and the like.

The advertisement provider computer 18 stores advertisement audit information in the accounting database 72. In the preferred embodiment, the advertisement audit information includes which advertisements are viewed by consumers, how often the advertisements are viewed, which consumers have viewed an advertisement, the number and type of advertisements a particular consumer has viewed, which content providers are requesting customized advertisements, the number and type of advertisements which are being displayed by a particular content provider computer 14, etc.

Maintaining a record of the advertisement audit information in the accounting database 72 provides a number of advantages. For example, because the accounting database 72 maintains a record of which advertisements have been viewed by consumers, advertisers can be billed based on actual delivery of the advertisements to pertinent consumers. Furthermore, advertisers can be billed based on how often a targeted demographic group views the advertisements.

In addition, the ability to monitor the number of advertisements displayed by a particular content provider computer 14 provides a number of advantages. For example, the advertisement provider can pay the content provider based on the volume of advertisements actually displayed by the content provider computer 14. This frees the content providers from having to generate advertising data, from having to individually contact advertisers, from having to negotiate advertising payment fees, and from having to maintain an advertising administrative staff.

Furthermore, because the preferred embodiment also is capable of storing a consumer's Internet provider account number in the registration database 68, the preferred embodiment can monitor the number of advertisements viewed by consumers associated with a particular Internet provider 34. Accordingly, the invention can pay an Internet provider 34 based on the number of advertisements viewed by its consumers. The Internet providers 34 can then use this advertising revenue to reduce consumer access fees. Alternatively, the preferred embodiment can pay a consumer for viewing advertisements by crediting a consumer's Internet provider account.

In addition, because the preferred embodiment also is capable of storing a consumer's digital cash account, the preferred embodiment can pay the consumer with digital cash each time the consumer views an advertisement. This allows the consumer to obtain digital cash which the consumer can use to purchase other goods and services offered for sale on the Internet 33.

IV. REGISTRATION AND CUSTOMIZED ADVERTISEMENT PROCESSING

FIG. 4 also illustrates flow of information when (1) a consumer registers with the advertisement provider computer 18, (2) a content provider registers with the advertisement provider computer 18, and (3) processing a customized advertisement 30. The data flow sequence for the consumer registration process is illustrated with event A. The data flow sequence for the content provider registration process is illustrated with event B. The data flow sequence for the customized advertisement processing is illustrated with events C through F.

A. Consumer Registration

Figure 5:
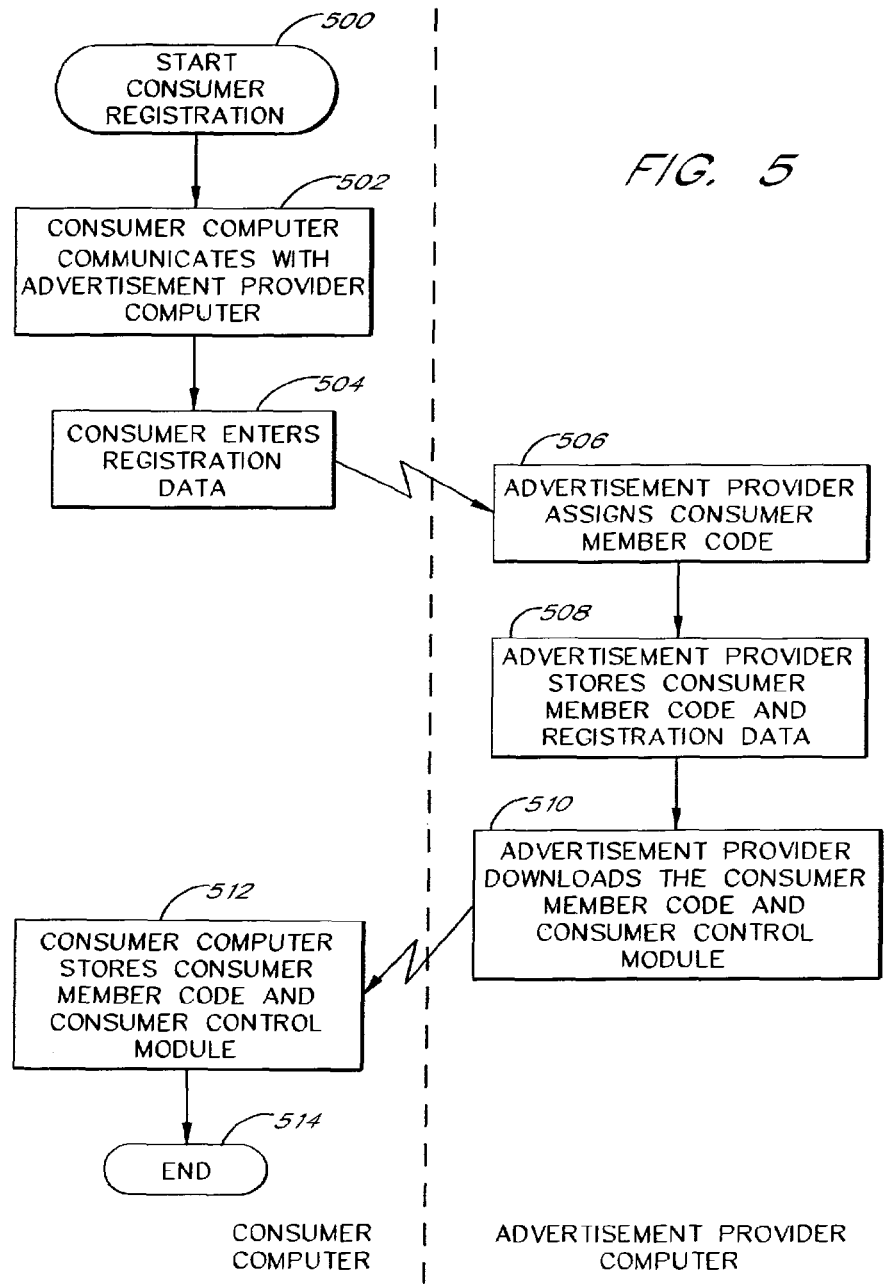
FIG. 5 is a flow diagram of the preferred process of registering a consumer with an advertisement provider.

With reference to event A, the consumer computer 12 registers with the advertisement provider computer 18 by first establishing a communications link with the advertisement provider computer 18. The flow diagram corresponding to event A is illustrated in FIG. 5. Beginning in a start state 500 in FIG. 5, the preferred embodiment of the present invention proceeds to state 502. In state 502, the consumer directs his consumer computer 12 to communicate with the advertisement provider computer 18. In particular, during state 502, the consumer inputs the URL of the advertising provider computer 18 into his consumer browser 40. The consumer browser 40 then establishes a link with the registration module 60.

Upon establishing a link with the registration module 60, the registration module 60 displays a HTML document which invites the consumer to input demographic information. Proceeding to state 504, the consumer enters information which includes, but is not limited to, age, sex, income, career, interests, hobbies, consumer preferences, the account number of the consumer's Internet provider 34, other account information, etc.

Proceeding to state 506, the registration module 60 assigns the consumer a consumer member code 22. Each consumer is assigned a separate consumer member code 22. Preferably, the consumer member code 22 comprises letters and numbers which uniquely identify the consumer. In the preferred embodiment, the registration module 60 assigns the consumer member code 22 with a CGI script which generates unique consumer member codes 22.

Proceeding to state 508, the registration module 60 stores the consumer member code 22 and the consumer's demographic data in the registration database 68. In the preferred embodiment, the registration module 60 uses standard structured query language instructions to add the consumer data and the consumer member code 22 to the registration database 68.

Proceeding to state 510, the registration module 60 then transfers the consumer member code 22 to the consumer computer 12. In the preferred embodiment, the registration module uses standard HTTP transfer procedures to transfer the consumer member code 22 to a cookie on the consumer computer 12.

Proceeding to state 512, the consumer browser 40 in the consumer computer 12 receives the consumer member code 22 and stores them on a computer accessible media. In the preferred embodiment, the consumer browser stores the consumer member code 22 in the consumer browser's Cookie. Proceeding to end state 514, the consumer computer 12 disconnects from the advertisement provider computer 18.

B. Content Provider Registration

Figure 6:
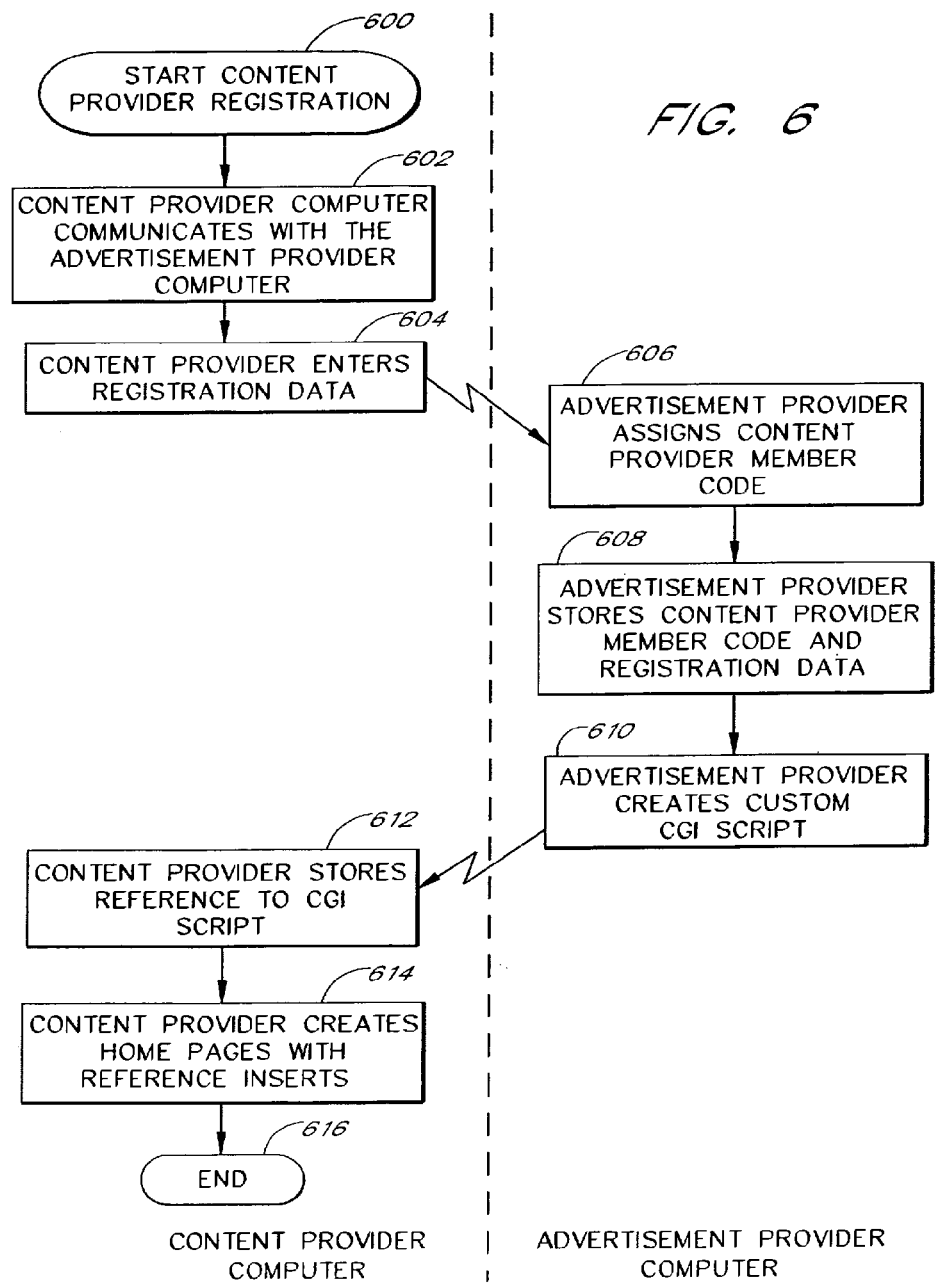
FIG. 6 is a flow diagram of the preferred process of registering a content provider with an advertisement provider.

With reference to event B illustrated in FIG. 4, the content provider computer registers with the advertisement provider computer 18 by first establishing a communications link with the advertisement provider computer 18. The flow diagram corresponding to Event B is illustrated in FIG. 6. Beginning in a start state 600, the preferred embodiment of the present invention proceeds to state 602. In state 602, the content provider directs his content provider computer 14 to establish a communications link with the registration module 60 in the advertisement provider computer 18.

Upon establishing a communications link with the registration module 60, the registration module 60 displays a HTML document which invites the content provider to input demographic information. Proceeding to state 604, the content provider enters information which includes, but is not limited to, the content provider's website address, the name of the content provider, the type of products and services sold by the content provider, the size of the content provider, the content provider's account information, etc.

Proceeding to state 606, the registration module 60 assigns the content provider a content provider member code 54. Each content provider is assigned a unique content provider member code 54. Preferably, the content provider member code 54 comprises letters and numbers which uniquely identify the content provider. In the preferred embodiment, the registration module 60 assigns the content provider member code 54 with a CGI script which generates unique content provider member codes 54.

Proceeding to state 608, the registration module 60 stores the content provider member code 54 and the content provider demographic data in the registration database 68. In the preferred embodiment, the registration module 60 uses standard structured query language instructions to add the content provider member code 54 and content provider data to the registration database 68.

Proceeding to state 610, the registration module 60 then creates the content provider script 64. Each content provider script corresponds to one of the content providers. In the preferred embodiment, the content provider script 64 contains the content provider member code. During state 610, the advertisement provider computer 18 creates the advertising request 26. Preferably, the advertising request 26 contains an HTML tag which identifies the URL of the advertising provider computer 18 and the content provider script assigned to the content provider. The registration module 60 uses standard HTTP transfer procedures to transfer the advertising insert 56 to the content provider computer 14.

Proceeding to state 612, the content provider computer 14 stores a copy of the advertisement request 26. Moving to state 614, the content provider computer 14 creates HTML electronic pages 32 which incorporate the advertising insert 56 and the advertisement request 26. The advertisement insert 56 defines the location where the customized advertisement 30 will appear in an electronic page 32. The advertisement request 26, on the other hand, references the content provider script 64 existing on the advertisement provider computer 18. The electronic pages 32 also include the information the content provider desires to convey to the consumers. Proceeding to end state 616, the content provider computer 14 disconnects from the advertisement provider computer 18.

C. Customized Advertisement Processing

As shown in the high level data flow diagram of FIG. 4, events C through F illustrate the process of displaying customized advertisements 30 in the preferred embodiment of the present invention. In event C, the consumer computer 12 establishes a communications link with the content provider computer 14. In event D, the content provider computer 14 sends the electronic page 32 to the consumer computer 14.

In event E, the consumer computer 12 processes the advertisement insert 56 in the electronic page 32. As explained above, the advertisement request 26 is an HTML tag which identifies the URL of the advertisement provider computer 18 and the content provider script 64 existing in the advertisement provider computer 18. When the consumer browser module 40 processes the advertising insert 56, the advertising insert 56 directs the consumer browser module 40 to establish a communications link with the advertisement provider computer 18.

Upon establishing the communications link, the HTML tag in the advertising insert 56 directs the advertising module 62 to execute the identified content provider script 64. The advertisement provider computer 18 obtains the content provider member code from the content provider script 64. In addition, the advertising module obtains the consumer member code 22 from the consumer computer 12.

In event F, the advertisement provider computer 18 uses the consumer member code 22 to access the consumer's profile in the registration database 68. The advertisement provider computer 18 processes the consumer preferences and selects an appropriate advertisement from the advertisement database 70. The advertisement provider computer 18 then sends the customized advertisement 30 directly to the consumer computer 12. The consumer's computer then merges and displays the electronic page 32 and the customized advertisement 30 to the consumer. In addition, during event F, the advertisement provider computer 18 stores the advertising audit information which specifies which advertisement was sent to the consumer computer 12, which consumer computer 12 received the advertisement, which consumer viewed the advertisement and which Internet provider 34, if any, provided Internet 33 access to the consumer computer 12. As discussed above, this information is stored to the accounting database 72.

Figure 7:
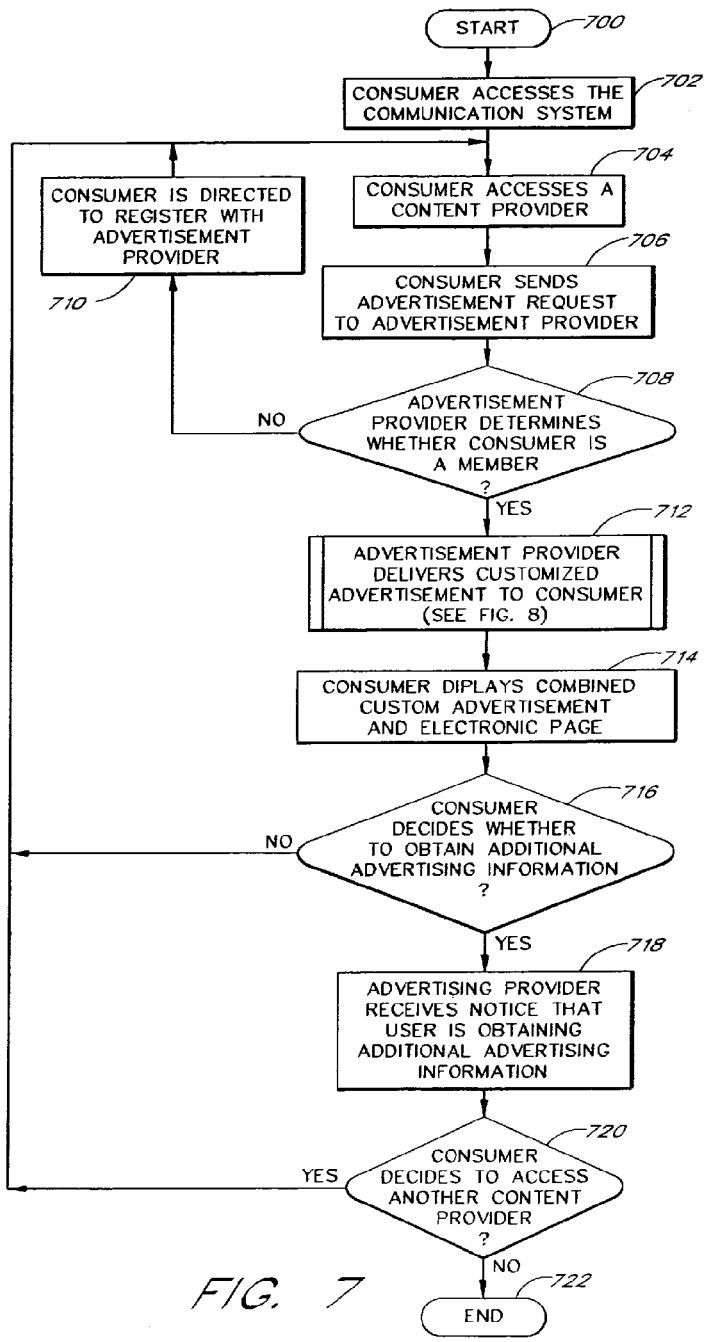
FIG. 7 is a flow diagram of the preferred process whereby a consumer accesses a content provider and is thereafter sent an electronic document and customer advertisement.

The operational states which occur during Events C through F will now be discussed in detail. FIG. 7 illustrates a flow chart of the operational states which occur when displaying a customized advertisement 30 to a consumer. Beginning in a start state 700, the consumer accesses the communications system in state 702. In the preferred embodiment, the consumer invokes the consumer browser 40 on his or her computer. The consumer then directs the consumer browser 40 to access the URL of the desired content provider computer 14.

Proceeding to state 704, the consumer browser 40 uses the TCP/IP Internet protocols to establish a communications link with the content server 50 in the content provider computer 14. The content provider computer 14 then uses the HTTP protocols to transfer an electronic page 32 to the consumer computer 12.

Proceeding to state 706, the consumer browser 40 processes the electronic page 32. While processing the electronic page 32, the consumer browser encounters the advertising insert 56 with its HTML tag. The advertising insert 56 directs the consumer computer 12 to send an advertisement request 26 to the advertisement provider computer 18. In the preferred embodiment, the HTML tag in the advertising insert 56 contains the URL of the advertising provider computer 18 and the content provider script 64 assigned to the content provider 14. Thus, the advertisement request 26 establishes a communications link with the advertisement provider computer 18 and invokes the identified content provider script 64.

Proceeding to decision state 708, the advertising module 62 in the advertisement provider computer 18 directs the consumer browser module 40 to send a copy of the Cookie which contains the consumer member code 22. The advertising module 62 extracts the consumer member code 22 from the Cookie and determines whether the consumer has registered with the advertisement provider computer 18. If the Cookie does not contain a consumer member code 22, the advertising module 62 proceeds to state 710. However, if the Cookie does contain a consumer member code 22, the advertising module 62 proceeds to state 712.

At state 710, the advertising module 62 fills the advertising insert 56 with an advertisement which directs the unregistered consumer to register with the advertisement provider computer 18. If the consumer has registered with the advertisement provider computer 18, the advertising module 62 proceeds to state 712. In state 712, the advertising module 62 processes the advertisement request 26. This will be discussed in more detail below in reference to FIG. 8.

After the advertisement provider delivers the customized advertisement to the consumer of state 712, the consumer receives the customized advertisement in state 714. During state 714, the consumer combines the customized advertisement with the electronic page that was requested by the consumer.

Proceeding to decision state 716, the consumer views the electronic page 32 and the customized advertisement 30. To the consumer, the electronic page 32 appears to contain the customized advertisement 30. During decision state 716, the consumer can decide to obtain additional information about the advertised goods or services by selecting the customized advertisement 30. In the preferred embodiment, the customized advertisement 30 contains a hyper-link to more advertising information. If the consumer is not interested in the advertised goods or services, the consumer proceeds back to state 704 and begins the process of viewing another electronic page 32.

During decision state 716, if the consumer continues to view the electronic page 32, the advertising module 62 continues to update the customized advertisements 30 that are seen on the consumer's computer 12. For example, if a consumer views a particular electronic page 32 for more than a minute, the advertising module 52 can send a new customized advertisement 30.

If the consumer desires to obtain more information about a good or service appearing in a customized advertisement 30, the consumer selects the customized advertisement 30 and proceeds to state 718. When the consumer selects the customized advertisement 30 during state 718, the consumer control module 42 sends a message to the advertising module 62 that the consumer has selected the customized advertisement 30. In response, the advertising module 62 stores the message in the accounting database 72.

The advertising module 62 can use such information to determine which advertisements are effective. In addition, the information allows the advertising module 62 to monitor what goods and services the consumer particularly desires. Furthermore, the advertising module 62 can charge the advertisers additional amounts whenever a consumer seeks to obtain additional advertising information. The advertising module 62 can then distribute the revenue as a bonus to the content providers and consumers. This gives the consumers additional incentive to seek more information about advertised goods and services.

Proceeding to decision state 720 the consumer decides to access other content provider computers 14 or to stop browsing the Internet 33. If the consumer desires to access other content provider computers 14, the process moves back to state 704. However, if the consumer desires to end browsing the Internet 33, the process moves to end state 722 wherein the consumer browser 40 is exited.

Figure 8:
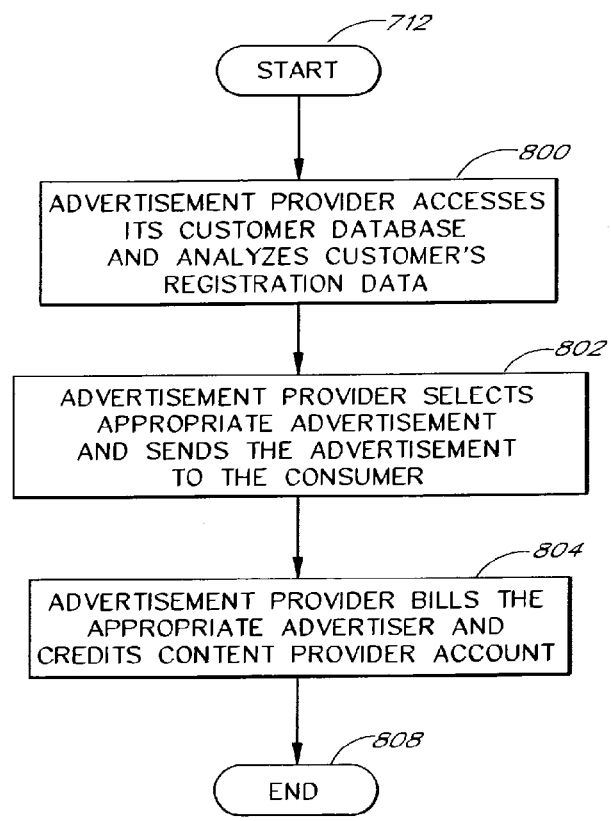
FIG. 8 is a detailed flow diagram of the preferred process where by the advertisement provider computer delivers the customized advertisement to the consumer computer.

In FIG. 8, a detailed flow chart of the operational states which occur during process 712 are shown. Beginning in a start state 712, the advertising module proceeds to state 800. In state 800, the advertising module 62 uses the consumer member code 22 to access the corresponding consumer preferences stored in the consumer's profile in the registration database 60. The advertising module 62 then processes the consumer preferences to determine the appropriate customized advertisement 30. In the preferred embodiment, the advertising module 62 uses well known advertising techniques to categorize the consumer into a particular demographic group based on the consumer's preferences. In another embodiment, the advertising module 62 identifies advertisements which correspond to specific preferences. In yet another embodiment, the advertising module 62 focuses on a subset of advertisements and then selects the most appropriate advertisement in the subset. In still other embodiments, the advertising module can be programmed to accommodate special sales and advertising promotions.

Proceeding to state 802, the advertising module 62 selects and retrieves the customized advertisement 30 from the advertising database and sends the customized advertisement 30 to the consumer. In the preferred embodiment, the customized advertisement 30 is stored in a HTML format, and the advertising module 62 uses the HTTP protocol to send the customized advertisement 30 to the consumer computer 12, where the customized advertisement 30 is displayed within the electronic page sent to the consumer computer.

Proceeding to state 804, the advertising module 62 accesses the accounting database 72 and debits the appropriate advertiser account, credits the content provider account and credits the appropriate consumer account. In particular, the advertising module 62 stores the advertising audit information in the accounting database 72. The advertising audit information includes the consumer member code 22 and the content provider member code 54.

With the advertising audit information, the advertising module 62 determines which advertiser should pay for the customized advertisement 30 and debits the appropriate advertiser account. In addition, the advertising module 62 credits the content provider's account. Still further, the advertising module 62 credits the appropriate consumer account. In the preferred embodiment, the advertising module 62 also credits the consumer's Internet provider account number. Thus, the consumer's access charges are reduced each time a consumer views a customized advertisement 30.

In other embodiments, the advertising module 62 also credits a consumer's digital cash account each time the consumer views a customized advertisement 30. The consumer can then use the digital cash to purchase goods and services offered for sale on the Internet 33.

Upon updating the accounting database 72, the advertising module proceeds to end state 810 where it waits until the next advertisement request 26.

V. OTHER EMBODIMENTS

Figure 9:
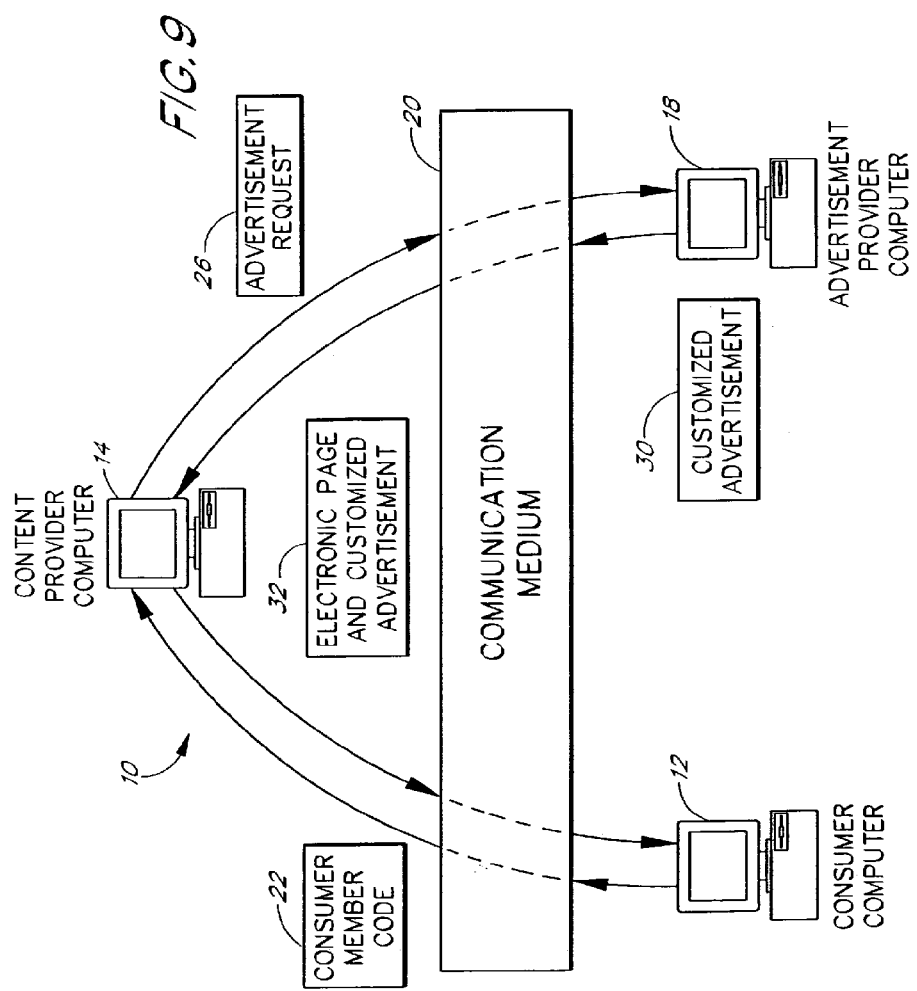
FIG. 9 is a block diagram of an alternative embodiment of the present invention wherein the customized advertisement is sent through the content provider computer prior to reaching the consumer computer.

FIG. 9 shows an alternative embodiment of the present invention wherein the advertisement provider computer 18 sends the customized advertisement 30 to the content provider computer 14.

Upon receiving the customized advertisement, the content provider incorporates the customized advertisement 30 into an electronic page 32. The content provider computer 14 then forwards the electronic page 32, combined with the customized advertisement 30 to the consumer computer 12. The consumer computer 12 then displays the electronic page 32 and customized advertisement 30 to the consumer. Because transferring the customized advertisement 30 from the advertisement provider computer 18 to the content provider computer 14 happens prior to sending the electronic page 32 to the consumer, the electronic page 32 appears to the consumer like all other electronic pages 32 on the Internet 33, except that it contains the customized advertisement 30 which has been pre-selected for that consumer.

The embodiment shown in FIG. 9 allows the customized advertisements 30 to be incorporated directly into the content provider's offerings. Thus, in addition to integrating the customized advertisements 30 in to an electronic page 32, the content provider computer 14 can integrate the customized advertisements 30 into offerings such as on-line games, video programming, internet radio, virtual reality environments and the like.

For example, assuming the content provider computer 14 offers consumers on-line games such as interactive car races. In this example, the content provider computer 14 can integrate the customized advertisements 30 into signs and billboards which appear in the interactive game. In other embodiments, the content provider computer 14 can integrate the customized advertisements 30 into three dimensional worlds defined by the Virtual Reality Modeling Language (VRML 1.0). VRML 1.0 is a draft specification for the design and implementation of a platform independent language for virtual reality scene description. VRML 1.0 was released on 26 May 1995. For instance, the content provider computer 14 may display a three-dimensional mall, shopping center or city which displays customized advertisements 30 on virtual reality posters and billboards.

Figure 10:
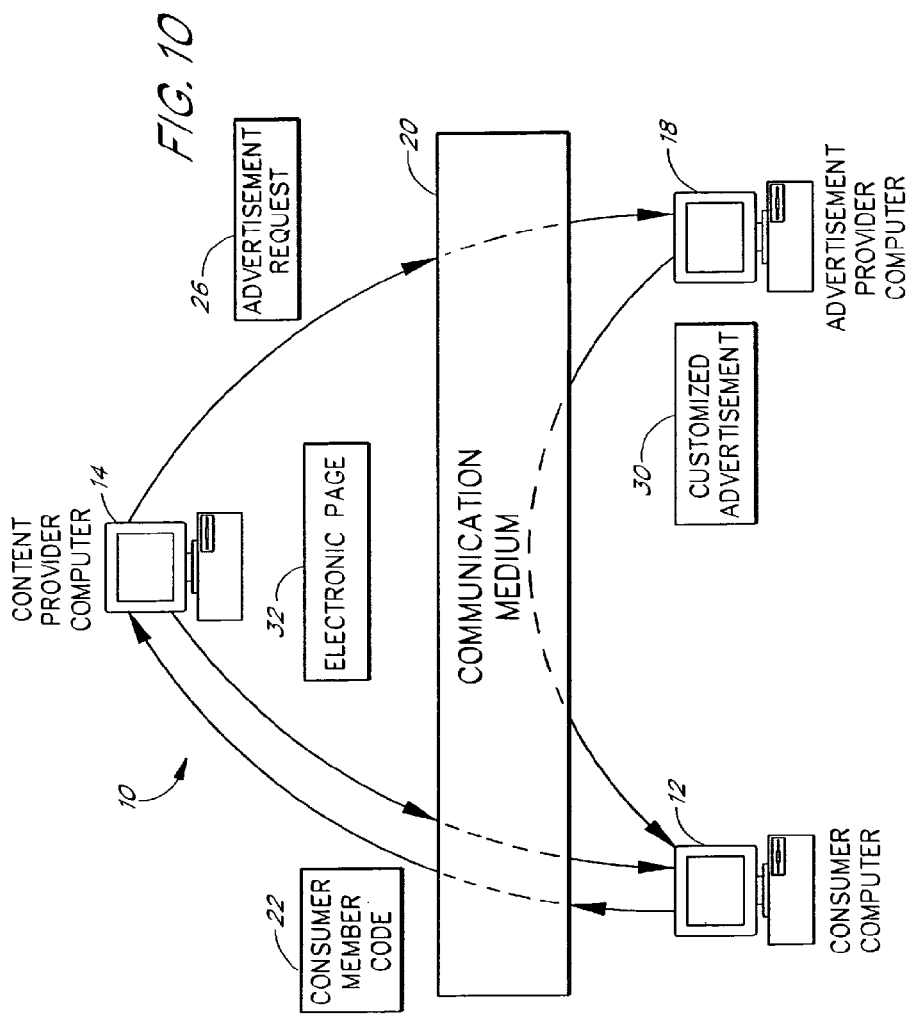
FIG. 10 is a block diagram of an alternative embodiment of the present invention wherein the content provider computer requests the customized advertisement and the advertisement computer then sends the customized advertisement directly to the consumer computer.
Figure 11:
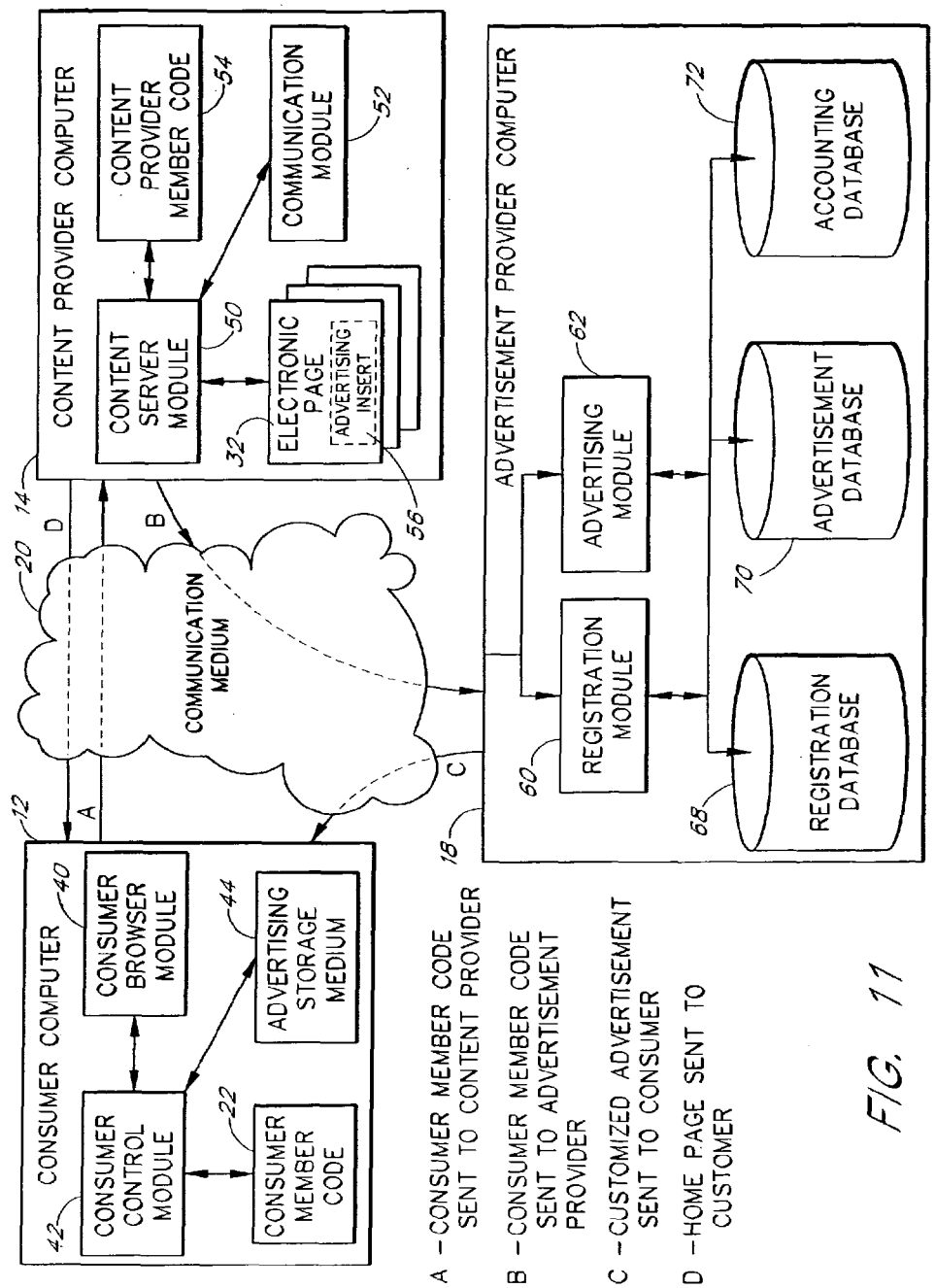
FIG. 11 is a block diagram of another embodiment of the present invention showing the flow of information among the consumer computer, content provider computer and advertisement provider computer through a communication medium.

In another embodiment illustrated in FIGS. 10 and 11, the interactive communication system 10 includes the consumer computer 12, the content provider computer 14 and the advertisement provider computer 18. In Event A, the consumer computer 12 establishes a communication link with the content provider computer 12, the consumer computer 12 then sends the consumer's member code 22 to the content provider computer 14. A unique communications module 52 in the content provider is invoked each time a consumer computer accesses an electronic page 32. The communications module 52 interacts with the content server 50. In this embodiment, the communications module 52 is a content server plug-in and thus, plug-in tags can be programmed to invoke the communications module 52.

Once invoked, the communications module 52 directs the content server 50 to obtain the consumers member code 22 when a consumer accesses the content server 14. Preferably, the consumer member code 22 is part of the information transmitted with the cookie from the consumer computer 12. Thus, the communication module 52 analyzes the information stored in the cookie and determines the consumer member code 22.

In event B, the content provider computer 14 sends an advertisement request 26 to the advertisement provider computer 18 via the communication medium 20. The advertisement request contains the consumer member code 22 and the content provider member code 54. When the content provider computer 14 obtains the consumer's member code 22, the content server 50 passes the consumer's member code 22 to the. communication module 52 which analyzes the consumer member code 22 in order to determine whether the consumer has registered with the advertisement provider computer 18.

The communications module 52 analyzes the consumer member code 22 by determining whether it conforms to a defined format. If not, the communications module 52 directs the content provider computer 14 to display the electronic page without a customized advertisement. If so, the communications module 52 proceeds directs the content server 50 to establish a communications link with the advertisement provider computer 18.

Thus, in this embodiment, the content provider computer 14 contains its own copy of the content provider member code 54. Furthermore, the advertisement provider computer does not execute a content provider script 64 when accessed by the content provider 14. Rather, the content provider 14 in this embodiment, sends a copy of the content provider member code 54 to the advertisement provider along with every advertisement request 26.

In event C, the advertisement provider computer 18 uses the consumer's member code 22 stored in the advertisement request 26 to access the consumer's profile in the registration database 68. Based on the consumer's profile, the advertisement provider computer 18 selects an appropriate customized advertisement 30. The advertisement provider computer 18 then sends the customized advertisement 30 to the consumer computer 12.

In this embodiment, the advertising module 62 in the advertisement provider computer 18 runs a single program for every content provider computer 14 and incorporates the content provider member code 54 into the program being run. In this manner, the advertisement provider knows the identity of the consumer computer via the consumer's member code 22 and the identity of the content provider computer 14 via the content provider's member code 54.

In event D, the content provider 14 sends the requested electronic page 32 to the consumer computer 12. Located in the consumer computer 12 is a software plug-in on the consumer computer 12 called the consumer control module 42 which merges the electronic page 32 and customized advertisement 30 into a single document. Preferably, the consumer control module 42 is a plug-in that works in conjunction with the consumer browser 40.

In other embodiments, the consumer control module 42 in the consumer computer 12 is adapted to receive a Java plug-in from the content provider computer 14 which creates a separate window which can display customized advertisements 30 on the consumer computer 12. The Java programming language is a robust, secure, architecture-neutral, portable, general-purpose programming language developed by Sun Microsystems. Java supports programming for the Internet 33 in the form of independent Java "applets". Additional information about the Java programming language can be obtained at http://www.sun.com.

In another embodiment, the consumer computer 12 stores the customized advertisements 30 on the advertising storage medium 44. Rather than receiving a copy of the customized advertisement 30 over the Internet 33, the consumer control module 42 receives an advertisement command which directs the consumer control module 42 to retrieve the customized advertisement 30 from the advertising storage medium 44.

Focusing now on the flow charts illustrated in FIGS. 7 and 8, the advertising module 62 in the advertisement provider computer obtains the appropriate advertisement command from the advertisement database 70 during state 804. The advertising module then sends the advertisement command to the consumer computer 12 in state 714.

During state 714, the consumer control module 42 combines the customized advertisement 30 identified by the advertisement command with the electronic page 32 and displays them to the consumer. As stated above, because current communications systems transfer data at much slower rates than local storage devices, the consumer computer 12 can retrieve a customized advertisement 30 from the advertising storage medium 44 much faster than obtaining the advertisement directly from the advertisement provider computer 18. Accordingly, a short advertisement command can be sent which specifically retrieves a particular advertisement from the advertising storage medium, which significantly reduces transmission times and response times across the communication medium 20.

VI. CONCLUSION

While certain preferred embodiments of the invention have been described, these embodiments have been presented by way of example only, and are not intended to limit the scope of the present invention. For example, although described herein with reference to the Internet 33, the customized advertisement system and methodology can be used in other types of interactive communication systems. Accordingly, the breadth and scope of the present invention should be defined only in accordance with the following claims and their equivalents.

What is claimed:

1. A computer-implemented method for a content provider computing device to provide content and data indicative of an advertisement to a consumer computing device, comprising:
   determining by the content provider computing device, based at least in part on information stored on the consumer computing device, consumer identifier information associated with a request for content from the consumer computing device;
   responsive to the request for content, sending, by the content computing device, a request for the data indicative of an advertisement from the content provider computing device to an advertisement computing device;
   sending, by the content provider computing device to the consumer computing device for display on the consumer computing device, the requested content and the data indicative of an advertisement received from the advertisement computing device in response to the request for the advertisement, the advertisement being selected by the advertisement computing device based on a consumer profile associated with the consumer identifier information; and
   requesting, by the content provider computing device, a credit for the data indicative of an advertisement sent by the content provider computing device to the consumer computing device.

2. The method as recited in claim 1, comprising determining the consumer identification information from a cookie stored on the consumer computing device.

3. The method as recited in claim 1, wherein the request for the data indicative of an advertisement is sent over a communications network.

4. The method as recited in claim 1, wherein the request for the advertisement comprises a content provider identifier.

5. The method as recited in claim 1, comprising embedding the advertisement with the requested content prior to sending to the consumer computing device.

6. The method as recited in claim 1, comprising sending the requested content in at least one HTML page.

7. The method as recited in claim 1, comprising registering a content provider associated with the content provider computing device with the advertisement computing device.

8. A computing device, comprising:
   a processor;
   a memory in communication with the processor and having stored thereon instructions that upon execution by the processor cause the computing device to at least:
   determine consumer identifier information associated with a request for content from a consumer computing device;
   send a request for an advertisement to an advertisement computing device based on the request for content and the consumer identifier information;
   process an advertisement selected by the advertisement computing device based on a consumer profile associated with the consumer identifier information;
   send to the consumer computing device the requested content along with the processed advertisement for display on the consumer computing device; and request a credit for the advertisement sent to the consumer computing device.

9. The device as recited in claim 8, the memory having stored thereon instructions that upon execution cause the computing device to at least determine the consumer identification information based on information stored on the consumer computing device.

10. The device as recited in claim 8, the memory having stored thereon instructions that upon execution cause the computing device to at least insert the advertisement into an electronic page containing the requested content.

11. The device as recited in claim 10, wherein the electronic page comprises HTML.

12. The device as recited in claim 8, wherein the request for the advertisement comprises a content provider identifier.

13. The device as recited in claim 8, the memory having stored thereon instructions that upon execution cause the computing device to at least register with the advertisement computing device a content provider associated with the computing device.

14. A non-transitory computer-readable storage medium, having stored thereon computer-readable instructions that upon execution on a first computing device at least cause:
   determining consumer identifier information associated with a request for content from a second computing device associated with a consumer;
   requesting an advertisement from a third computing device associated with an advertiser, the request for the advertisement based on the request for content and the consumer identifier information;
   sending from the first computing device to the second computing device an electronic page comprising the requested content along with the advertisement received from the third computing device; and
   sending a request for a credit for the advertisement sent by the first computing device to the second computing device.

15. The non-transitory computer-readable storage medium as recited in claim 14, further having stored thereon computer-readable instructions that upon execution on the first computing device at least cause determining the consumer identification information from information stored on the second computing device.

16. The non-transitory computer-readable storage medium as recited in claim 15, further having stored thereon computer-readable instructions that upon execution on the first computing device at least cause determining the consumer identification information from information stored in a cookie that is received from the second computing device.

17. The non-transitory computer-readable storage medium as recited in claim 14, further having stored thereon computer-readable instructions that upon execution on the first computing device at least cause insertion of the advertisement into the electronic page containing the requested content.

18. The non-transitory computer-readable medium as recited in claim 14, wherein the electronic page comprises HTML.

19. The non-transitory computer-readable medium as recited in claim 14, wherein the request for an advertisement comprises a content provider identifier.

20. The non-transitory computer-readable storage medium as recited in claim 14, further having stored thereon computer-readable instructions that upon execution on the first computing device at least cause registering a content provider associated with the first computing device with the third computing device.

* * * * *